United States Patent
Sato et al.

(10) Patent No.: US 9,969,642 B2
(45) Date of Patent: May 15, 2018

(54) ONE-PRESS MANUFACTURING METHOD FOR GLASS CONTAINER AND GLASS CONTAINER

(71) Applicant: KOA GLASS CO., LTD., Ichikawa-shi, Chiba (JP)

(72) Inventors: Tsuyoshi Sato, Ichikawa (JP); Daisuke Date, Ichikawa (JP)

(73) Assignee: KOA GLASS CO., LTD, Edogawa-ku, Tokyo (JP)

( * ) Notice: Subject to any disclaimer, the term of this patent is extended or adjusted under 35 U.S.C. 154(b) by 535 days.

(21) Appl. No.: 14/889,120

(22) PCT Filed: Aug. 27, 2013

(86) PCT No.: PCT/JP2013/072788
§ 371 (c)(1),
(2) Date: Nov. 4, 2015

(87) PCT Pub. No.: WO2014/196090
PCT Pub. Date: Dec. 11, 2014

(65) Prior Publication Data
US 2016/0083280 A1    Mar. 24, 2016

(30) Foreign Application Priority Data

Jun. 6, 2013 (JP) ................. 2013-119435

(51) Int. Cl.
*C03B 11/06* (2006.01)
*C03B 11/10* (2006.01)
(Continued)

(52) U.S. Cl.
CPC ............. *C03B 11/10* (2013.01); *B65D 1/02* (2013.01); *C03B 11/127* (2013.01);
(Continued)

(58) Field of Classification Search
CPC ....... C03B 9/3645; C03B 11/06; C03B 11/10; C03B 11/127
See application file for complete search history.

(56) References Cited

U.S. PATENT DOCUMENTS 1,995,662 A    3/1935    Beck
8,327,665 B2 *  12/2012   Ishigame ............... C03B 9/385
                                                    65/66
(Continued)

FOREIGN PATENT DOCUMENTS

JP    1990160628 A    6/1990
JP    2000211930 A    8/2000
WO    2010016308 A1   11/2010

OTHER PUBLICATIONS

Extended European Search Report dated Jan. 30, 2017 for related EP Appln. No. 13 88 6528.2.

*Primary Examiner* — Cynthia Szewczyk
(74) *Attorney, Agent, or Firm* — Renner, Kenner; Arthur M. Reginelli

(57) ABSTRACT

There are provided a one-press manufacturing method for a glass container that can form uneven shapes on an inner peripheral surface of a glass container and a glass container that is obtained by the one-press manufacturing method.
The one-press manufacturing method for a glass container includes the following steps (A) to (E);
(A) a step of putting a gob in a pressing mold and then inserting a plunger, which includes an unevenness forming member provided so as to be capable of being received in the plunger, into the gob while the unevenness forming member is received in the plunger,
(B) a step of forming a glass container having a finished shape, which includes an uneven shape on an inner peripheral surface thereof, by pressing the unevenness forming member against the surface of the gob, which (Continued)

comes into contact with the unevenness forming member, to the outside from the inside of the plunger,
(C) a step of receiving the unevenness forming member in the plunger,
(D) a step of extracting the plunger, in which the unevenness forming member is received, from the glass container having a finished shape that includes the uneven shape on the inner peripheral surface thereof, and
(E) a step of transporting the glass container having a finished shape, which includes the uneven shape on the inner peripheral surface thereof, to a cooling mold and cooling the glass container having a finished shape.

9 Claims, 26 Drawing Sheets

(51) Int. Cl.
    *C03B 11/12* (2006.01)
    *B65D 1/02* (2006.01)
    *C03B 9/193* (2006.01)
    *C03B 9/38* (2006.01)

(52) U.S. Cl.
    CPC ............ *C03B 9/1932* (2013.01); *C03B 9/385* (2013.01); *C03B 9/3866* (2013.01); *C03B 9/3875* (2013.01); *C03B 2215/404* (2013.01); *C03B 2215/41* (2013.01)

(56) References Cited

U.S. PATENT DOCUMENTS

| | | |
|---|---|---|
| 2010/0147029 A1 | 6/2010 | Ishigame |
| 2012/0304698 A1 | 12/2012 | Froissart |
| 2012/0305432 A1* | 12/2012 | Froissart ............. C03B 23/0013 206/459.5 |
| 2013/0145797 A1* | 6/2013 | Lequien .................. C03B 11/10 65/68 |

* cited by examiner

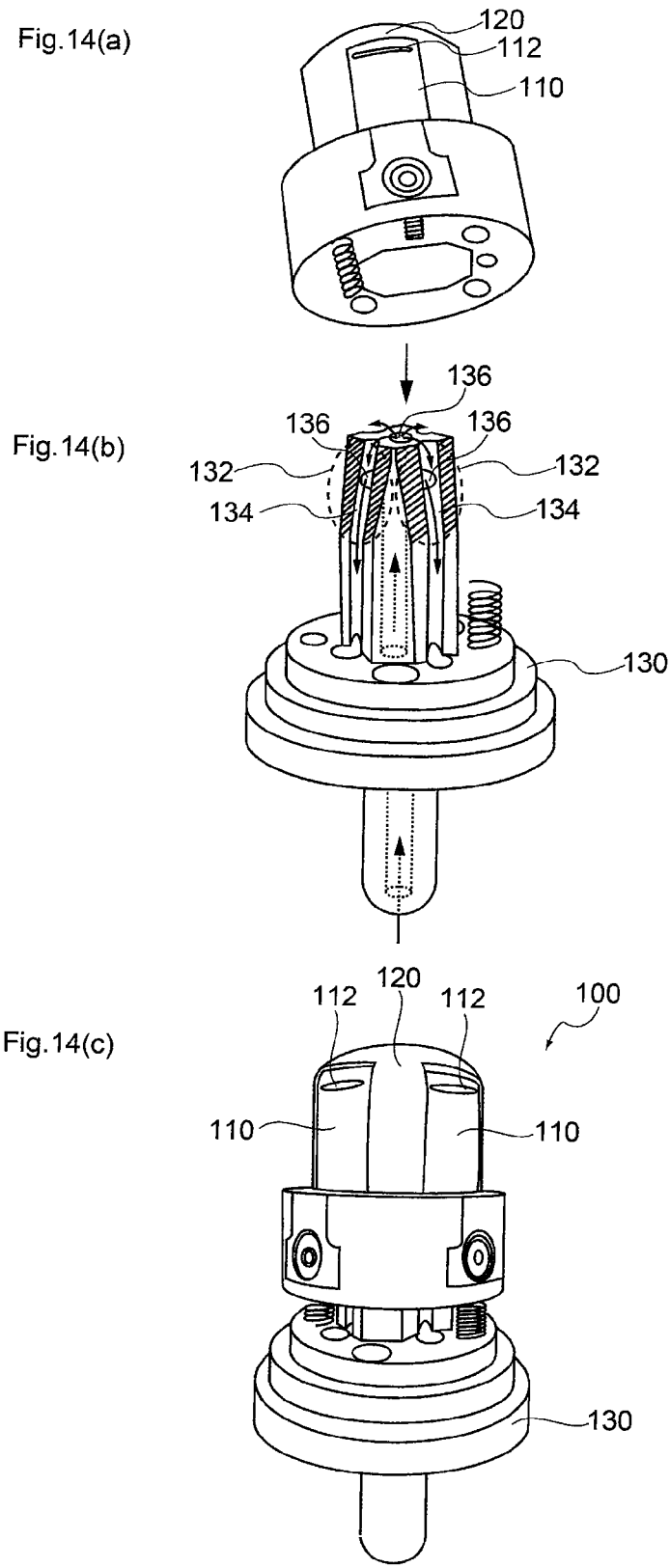

ONE-PRESS MANUFACTURING METHOD FOR GLASS CONTAINER AND GLASS CONTAINER

TECHNICAL FIELD

The present invention relates to a one-press manufacturing method for a glass container that molds a glass container having a finished shape by one-time press and manufactures a glass container by cooling the glass container having a finished shape, and the glass container.

Particularly, the present invention relates to a one-press manufacturing method for a glass container that can form uneven shapes on an inner peripheral surface of a glass container, and a glass container that is obtained by the one-press manufacturing method.

BACKGROUND ART

In the past, since glass is chemically stable and is excellent in transparency, glass has been frequently used as the material of a container and the container has been generally manufactured by a mold.

Further, a blow-and-blow molding method and a press-and-blow molding method have been known as a method of industrially continuously manufacturing the glass container.

For example, in the blow-and-blow molding method, a rough mold is filled with a lump of molten glass called a gob and air is blowing into the rough mold to form a parison.

Then, after the obtained parison is transported to a finishing mold and is reheated, air is blown into the parison to make the parison to swell and to mold the parison in the form of the finishing mold.

Meanwhile, in the press-and-blow molding method, a rough mold is filled with a gob and a plunger is inserted into the rough mold to form a parison.

Then, after the obtained parison is transported to a finishing mold and is reheated, air is blown into the parison to make the parison to swell and to mold the parison in the form of the finishing mold.

However, in the blow-and-blow molding method or the press-and-blow molding method, air is blown into the parison to mold the parison in a molding step. Accordingly, a glass container to be manufactured has a characteristic in which the inner diameter of a main body is larger than the inner diameter of a mouth portion.

For this reason, when a glass container is used while a cream-like material such as cosmetics is stored in the glass container, it may be difficult to take out the contents that adhere to a portion of the main body of the glass container close to the mouth portion.

Further, in these molding methods, the parison is molded by blowing air so that the parison comes into pressure contact with the inner surface of the finishing mold. For this reason, since the unevenness of the inner surface of the finishing mold or the mark of air remaining in the finishing mold remains on the surface of a glass container to be obtained, there is also a concern that the quality of the glass container becomes poor.

In regard to a problem that it is difficult to take out the contents, it is possible to make a material, which is stored in the glass container, be easily taken out by increasing the thickness of the wall of the glass container so that the inner diameter of the mouth portion is substantially equal to the inner diameter of the main body.

Furthermore, it is possible to prevent a problem that unevenness is formed on the surface of the glass container, by preventing the surface of a glass container having a finished shape from coming into contact with the finishing mold during the molding of a glass container.

Accordingly, a one-press manufacturing method, which can efficiently manufacture a thick glass container having the above-mentioned shape, is proposed (see Patent Document 1).

More specifically, the one-press manufacturing method includes: a pressing step of forming a glass container having a finished shape by inserting a plunger into a finishing mold filled with a gob; and a cooling step of moving the glass container having a finished shape to a cooling mold and forcibly cooling the outer peripheral surface and the inner peripheral surface of the glass container having a finished shape by cooling air that is blown into the cooling mold and cooling air that is blown into the glass container having a finished shape.

That is, there is an aspect of a one-press manufacturing method of forcibly cooling the inner peripheral surface and the outer peripheral surface of a glass container 510 having a finished shape by using cooling air 512 blown into the glass container 510 having a finished shape and cooling air 514 blown into a cooling mold 500 together as illustrated in FIG. 23.

On the other hand, particularly, in the field of perfume or cosmetics, uneven shapes, which represent a brand name or a material stored in a glass container, are tried to be carved on the inner peripheral surface of the glass container to obtain a predetermined visual effect (see Patent Documents 2 to 4).

That is, Patent Document 2 discloses a method of manufacturing a glass container including the following steps (a) to (d);
(a) a step of introducing molten glass into a mold,
(b) a step of inserting a punch body (hereinafter, referred to as a "plunger" in some cases) into the mold,
(c) a step of molding a glass container by the punch body and forming a pattern, which is formed of convex or concave shapes, on an inner peripheral surface of the glass container, and
(d) a step of obtaining a glass container including the pattern, which is formed of convex or concave shapes, on the inner peripheral surface thereof by taking the glass container out of the mold after extracting the punch body from the inside of the mold.

Further, as illustrated in FIG. 24, a punch body 610 used in the method of manufacturing a glass container disclosed in Patent Document 2 is formed of a cylindrical part 611 having a tapered end portion 613, and the end portion 613 includes the pattern 615, which is formed of convex or concave shapes, on the outer peripheral surface thereof.

Furthermore, Patent Document 3 discloses a device that includes at least one plunger for performing marking on an inner peripheral surface of a glass container. The device includes the following structures (a) to (c);
(a) a pattern that is formed of convex or concave shapes,
(b) a support that moves the plunger between a first position present outside the glass container and a second position present inside the glass container,
(c) a radial moving member that moves the plunger between a preparation position, which is separated from an inner peripheral surface of a glass container, and a performing position where the pattern including the convex or concave shapes is pressed against the inner peripheral surface of the glass container to perform marking, at the second position.

More specifically, there is a manufacturing device 700 illustrated in FIG. 25, and a plunger 717 is disposed at a second position, which is present inside the glass container, by a support 749.

Then, when the support 749 is pressed down, L-shaped members 716 radially slide to the outside along inclined grooves 743 and plungers 717 are pressed against the inner peripheral surface of a glass container 701. Accordingly, the pattern, which is formed of convex or concave shapes, is formed.

In addition, Patent Document 4 discloses a device that manufactures a glass container. The device includes a mold, and a punch body (hereinafter, referred to as a "plunger" in some cases) that can be moved between a preparation position present outside the mold and a performing position present inside the mold. The punch body includes a marking part that is formed of a pattern formed of convex or concave shapes, and an actuator that performs marking on the inner peripheral surface of the glass container by radially moving the pattern formed of the convex or concave shapes at the performing position.

More specifically, there is a manufacturing device 800 illustrated in FIG. 26, and a truncated conical member 833 on which grooves 835 are formed is provided at a free end portion of a piston 832 of an actuator 830.

Accordingly, when the truncated conical member 833 is pressed down by the piston 832, a marking part 825, which is slidably fitted to the groove 835, is extruded to the outside of a punch body 820. As a result, the pattern, which is formed of the convex or concave shapes, is formed on the inner peripheral surface of a glass container 801.

CITATION LIST

Patent Document

Patent Document 1: JP 2000-211930 A (claims and the like)
Patent Document 2: US 2013/0145797 (claims and the like)
Patent Document 3: US 2012/0305432 (claims and the like)
Patent Document 4: US 2012/0304698 (claims and the like)

DISCLOSURE OF THE INVENTION

Problem to be Solved by the Invention

However, since the inner diameter of a mouth portion of the glass container, which is obtained by the one-press manufacturing method in the related art disclosed in Patent Document 1, is substantially equal to that of a main body thereof, there is a problem in that foundation, eye shadow, or the like, which is stored in the form of a lump by being pressed from above, falls to the outside of the container in whole when the glass container is inverted.

Further, even though anti-slip protrusions or the like are tried to be formed on the inner peripheral surface of the glass container, which is obtained by the one-press manufacturing method in the related art disclosed in Patent Document 1, in order to prevent the falling of the lump of the stored material to the outside of the container, there is a problem in that it is difficult to form the anti-slip protrusions or the like due to the characteristics of the one-press manufacturing method.

That is, in the one-press manufacturing method, the inner peripheral surface of the glass container is formed by the insertion of the plunger into the gob, and the inserted plunger needs to be extracted while the shape of the formed inner peripheral surface is maintained.

Accordingly, in the one-press manufacturing method in the related art disclosed in Patent Document 1, there is a problem in that uneven shapes cannot be positively formed on the inner peripheral surface of the glass container in principle.

Meanwhile, when uneven shapes are tried to be formed on the inner peripheral surface of a molded glass container, it is likely to be difficult to clearly form desired uneven shapes since the inner peripheral surface of the glass container does not have sufficient softness due to the lowering of temperature.

Accordingly, it is necessary to form uneven shapes at the time of the molding of the inner peripheral surface of the glass container in order to positively form uneven shapes on the inner peripheral surface of the glass container.

In this regard, in the case of the method of manufacturing a glass container disclosed in Patent Document 2, it is possible to form uneven shapes on the inner peripheral surface of the glass container in spite of a one-press manufacturing method by using the plunger 610 that includes the pattern 615, which is formed of convex or concave shapes, on the outer peripheral surface illustrated in FIG. 24.

That is, in Patent Document 2, the uneven shapes formed on the inner peripheral surface of the glass container are sufficiently soft when the temperature of the glass container is still high. Accordingly, even though the uneven shapes are deformed when the plunger is extracted, the uneven shapes return to original shapes.

However, actually, it is difficult to return the deformed uneven shapes to the completely original shapes. For this reason, there is a problem in that the uneven shapes cannot be formed with high accuracy.

Further, in the case of the device disclosed in Patent Document 3, as apparent from the illustration of the plungers 717 to be pressed against the inner peripheral surface of the glass container 701 as illustrated in FIG. 25, it is not possible to mold a glass container by the device 700.

That is, there is a problem in that the device disclosed in Patent Document 3 can form uneven shapes on the inner peripheral surface of a molded glass container but cannot form uneven shapes on the inner peripheral surface while molding a glass container by a one-press manufacturing method.

Furthermore, in the case of the device disclosed in Patent Document 4, the marking part 825 is slidably fitted to the groove 835 formed on the truncated conical member 833 as illustrated in FIG. 26. For this reason, there is a problem in that the slide of the marking part 825 is inhibited by the thermal expansion of the member under a high temperature condition not lower than a predetermined temperature.

Particularly, the plunger is exposed to a very high temperature condition in the case of a one-press manufacturing method in which the plunger is directly inserted into high-temperature molten glass (gob) and should be maintained until the gob is cooled so that the surface of the gob is maintained in a constant shape.

Accordingly, since the member is significantly thermally expanded when the device disclosed in Patent Document 4 is used in a one-press manufacturing method, there is a problem in that it is difficult to smoothly slide the marking part.

Therefore, the inventors of the invention performed earnest examination in consideration of the above-mentioned problems. As a result, the inventors of the invention found a method of forming uneven shapes on an inner peripheral surface of a glass container in spite of a one-press manufacturing method by using a plunger including predetermined unevenness forming members, and completed the invention.

That is, the invention provides a one-press manufacturing method for a glass container that can form uneven shapes on an inner peripheral surface of a glass container and a glass container that is obtained by the one-press manufacturing method.

Means for Solving Problem

According to a one-press manufacturing method for a glass container of the invention, a one-press manufacturing method for a glass container including the following steps (A) to (E);

(A) a step of putting a gob in a pressing mold and then inserting a plunger, which includes an unevenness forming member provided so as to be capable of being received in the plunger, into the gob while the unevenness forming member is received in the plunger, (B) a step of forming a glass container having a finished shape, which includes an uneven shape on an inner peripheral surface thereof, by pressing the unevenness forming member against the surface of the gob, which comes into contact with the unevenness forming member, to the outside from the inside of the plunger, (C) a step of receiving the unevenness forming member in the plunger, (D) a step of extracting the plunger, in which the unevenness forming member is received, from the glass container having a finished shape that includes the uneven shape on the inner peripheral surface thereof, and (E) a step of transporting the glass container having a finished shape, which includes the uneven shape on the inner peripheral surface thereof, to a cooling mold and cooling the glass container having a finished shape, is provided and the above-mentioned problems can be solved.

That is, according to the one-press manufacturing method for a glass container of the invention, since the plunger including predetermined unevenness forming members is used, uneven shapes can be formed on the inner peripheral surface of the glass container in spite of a one-press manufacturing method.

Accordingly, in spite of the one-press manufacturing method, it is possible to manufacture a glass container that effectively suppresses the falling of a lump of the stored material, such as foundation or eye shadow, to the outside of the container even though the glass container is inverted. In addition, it is also possible to form uneven shapes, which have excellent design, on the inner peripheral surface of the glass container.

Moreover, when the stored material is cream, the uneven shapes can also be used to adjust the amount of cream to be taken out of the glass container.

Meanwhile, in the invention, "the glass container having a finished shape" means a glass container of which the temperature is high before the completion of a cooling step.

Further, the shape of "the glass container having a finished shape" is the same as the shape of a glass container that is finally obtained after the cooling step, that is to say, "a finished shape".

Furthermore, in the one-press manufacturing method for a glass container of the invention, it is preferable that the plunger includes the unevenness forming member, a molding surface member that includes an opening portion receiving the unevenness forming member, and a pressing member that is movably fitted to the molding surface member, and the pressing member is pressed into the molding surface member, so that the unevenness forming member is pressed to the outside from the inside of the plunger through the opening portion of the molding surface member.

Since the method is performed as described above, it is possible to form the uneven shapes on the inner peripheral surface of the glass container by more stably pressing the unevenness forming members against the surface of the gob, which comes into contact with the unevenness forming members, to the outside from the inside of the plunger.

Moreover, in the one-press manufacturing method for a glass container of the invention, it is preferable that the pressing member includes an inclined surface which is inclined toward a tip of the plunger, and the unevenness forming member is pressed to the outside from the inside of the plunger through the opening portion of the molding surface member by the inclined surface when the pressing member is pressed into the molding surface member.

Since the method is performed as described above, it is possible to form the uneven shapes on the inner peripheral surface of the glass container by still more stably pressing the unevenness forming members against the surface of the gob, which comes into contact with the unevenness forming members, to the outside from the inside of the plunger.

Further, in the one-press manufacturing method for a glass container of the invention, it is preferable that the plunger includes a plurality of unevenness forming members, and the pressing member includes inclined surfaces which number is equal to those of the unevenness forming members.

Since the method is performed as described above, it is possible to form the uneven shapes on the inner peripheral surface of the glass container by more efficiently pressing the unevenness forming members against the surface of the gob, which comes into contact with the unevenness forming members, to the outside from the inside of the plunger.

Furthermore, in the one-press manufacturing method for a glass container of the invention, it is preferable that the pressing member includes a cooling-air introduction passage that is provided in the pressing member and a cooling air hole that allows cooling air, which is present in the cooling-air introduction passage, to flow to the outside of the pressing member, and the inclined surface of the pressing member includes a cooling air groove that allows the cooling air, which flows out of the cooling air hole, to flow between the pressing member and the unevenness forming member.

Since the method is performed as described above, the unevenness forming members can be efficiently cooled from the inside and the reduction of the mobility of the unevenness forming members caused by thermal expansion can be effectively suppressed.

Moreover, in the one-press manufacturing method for a glass container of the invention, it is preferable that the unevenness forming member is biased by a sprig member so as to be received in the opening portion of the molding surface member except when the pressing member is pressed into the molding surface member.

Since the method is performed as described above, it is possible to more stably control the pressing of the unevenness forming members against the surface of gob and the receiving of the unevenness forming members in the opening portion while allowing the movement of the pressing member and the movement of the unevenness forming members to interlock with each other.

Further, in the one-press manufacturing method for a glass container of the invention, it is preferable that, except when the pressing member is pressed into the molding surface member, the pressing member is biased by a second spring member, which is a spring member separate from a first spring member when the spring member is referred to as the first spring member, so that the unevenness forming member is received in the opening portion of the molding surface member.

Since the method is performed as described above, it is possible to still more stably control the pressing of the unevenness forming members against the surface of gob and the receiving of the unevenness forming members in the opening portion while reliably allowing the movement of the pressing member and the movement of the unevenness forming members to interlock with each other by a biasing effect of the second spring member together with a biasing effect of the above-mentioned first spring member.

Furthermore, in the one-press manufacturing method for a glass container of the invention, it is preferable that the unevenness forming member includes a lateral groove on a contact surface thereof coming into contact with the surface of the gob.

Since the method is performed as described above, elliptical or rectangular convex shapes extending in a lateral direction can be formed on the inner peripheral surface of the glass container. Accordingly, it is possible to more easily manufacture the glass container that suppresses the falling of the lump of the stored material, such as foundation or eye shadow, to the outside of the container even though being inverted.

Moreover, in the one-press manufacturing method for a glass container of the invention, it is preferable that S1/S2 is set to a value of 0.4 or less when a total area of the opening portions of the molding surface member is denoted by S1 (mm$^2$) and the area of an inner portion of the glass container having a finished shape is denoted by S2 (mm$^2$)

Since the method is performed as described above, it is possible to effectively suppress the carving of the contour shapes of the unevenness forming members in a linear shape on the inner peripheral surface of the glass container.

Meanwhile, "the area of an inner portion of the glass container having a finished shape" means the sum of the area of the inner peripheral surface of the glass container having a finished shape and the area of the inner bottom surface of the glass container having a finished shape.

Further, according to another aspect of the invention, there is provided a glass container that includes an uneven shape on an inner peripheral surface thereof and is obtained by a one-press manufacturing method for a glass container. The one-press manufacturing method for a glass container includes the following steps (A) to (E).

(A) a step of putting a gob in a pressing mold and then inserting a plunger, which includes an unevenness forming member provided so as to be capable of being received in the plunger, into the gob while the unevenness forming member is received in the plunger (B) a step of molding a glass container having a finished shape, which includes an uneven shape on an inner peripheral surface thereof, by pressing the unevenness forming member against the surface of the gob, which comes into contact with the unevenness forming member, to the outside from the inside of the plunger (C) a step of receiving the unevenness forming member in the plunger (D) a step of extracting the plunger, in which the unevenness forming member is received, from the glass container having a finished shape that includes the uneven shape on the inner peripheral surface thereof (E) a step of transporting the glass container having a finished shape, which includes the uneven shape on the inner peripheral surface thereof, to a cooling mold and cooling the glass container having a finished shape That is, since the glass container of the invention is obtained by a predetermined manufacturing method, it is possible to effectively suppress the falling of a lump of the stored material, such as foundation or eye shadow, to the outside of the container even though the glass container is inverted. In addition, it is also possible to form uneven shapes, which have excellent design, on the inner peripheral surface of the glass container.

BRIEF DESCRIPTION OF DRAWINGS

FIGS. 14(a) to 14(c) are other diagrams illustrating the respective components of the plunger;

BEST MODES FOR CARRYING OUT THE INVENTION

An embodiment of the invention is a one-press manufacturing method for a glass container that includes the following steps (A) to (E).

(A) A step of putting a gob in a pressing mold and then inserting a plunger, which includes an unevenness forming member provided so as to be capable of being received in the plunger, into the gob while the unevenness forming member is received in the plunger (B) A step of forming a glass container having a finished shape, which includes an uneven shape on an inner peripheral surface thereof, by pressing the unevenness forming member against the surface of the gob, which comes into contact with the unevenness forming member, to the outside from the inside of the plunger (C) A step of receiving the unevenness forming member in the plunger (D) A step of extracting the plunger, in which the unevenness forming member is received, from the glass container having a finished shape that includes the uneven shape on the inner peripheral surface thereof (E) A step of transporting the glass container having a finished shape, which includes the uneven shape on the inner peripheral surface thereof, to a cooling mold and cooling the glass container having a finished shape Further, another embodiment of the invention is a glass container that is obtained by the above-mentioned one-press manufacturing method for a glass container.

These embodiments will be specifically described below with reference to the drawings.

1. Glass Container (1) Shape

The shape of the appearance of the glass container of the invention is not particularly limited, and it is preferable that the glass container is a bottleneck type glass bottle, a rectangular glass bottle, a cylindrical glass bottle, a deformed glass bottle, a rectangular glass box, a cylindrical glass box, a deformed glass box, or the like according to use.

Figure 1A:
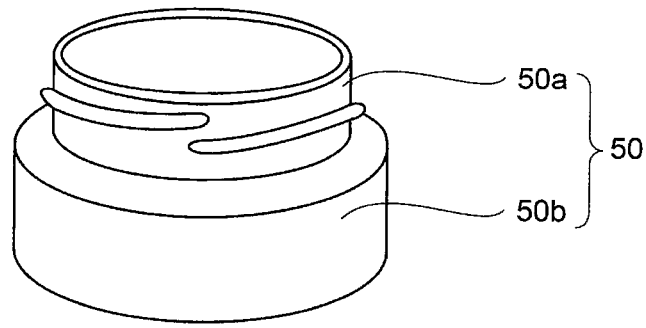
FIGS. 1(a) to 1(c) are diagrams illustrating the appearance of a glass container of the invention.
Figure 1B:
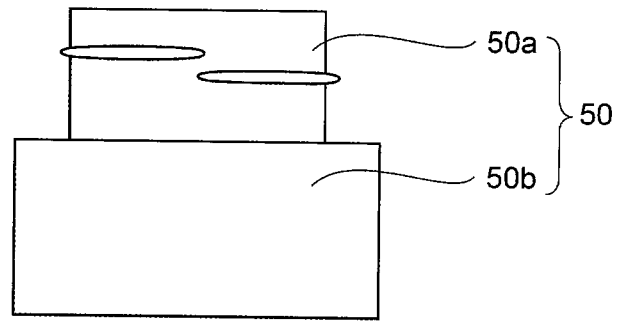

Further, the glass container may be typically a glass container 50 illustrated in FIGS. 1(*a*) to 1(*c*).

More specifically, FIG. 1(*a*) illustrates the glass container 50 that includes a columnar main body 50*b* having a substantially circular planar shape and a cylindrical mouth portion 50*a*.

Here, FIG. 1(*a*) is a perspective view of the glass container 50.

Further, FIG. 1(*b*) is a front view of the glass container 50 illustrated in FIG. 1(*a*), and FIG. 1(*c*) is a plan view (top view) of the glass container 50 illustrated in FIG. 1(*a*).

Since the glass container 50 of the invention is obtained by a one-press manufacturing method as described above, the glass container 50 may include a thick portion that is partially formed and is difficult to be manufactured by a blow-and-blow molding method or a press-and-blow molding method.

However, needless to say, the glass container may not include such a thick portion.

Figure 2A:
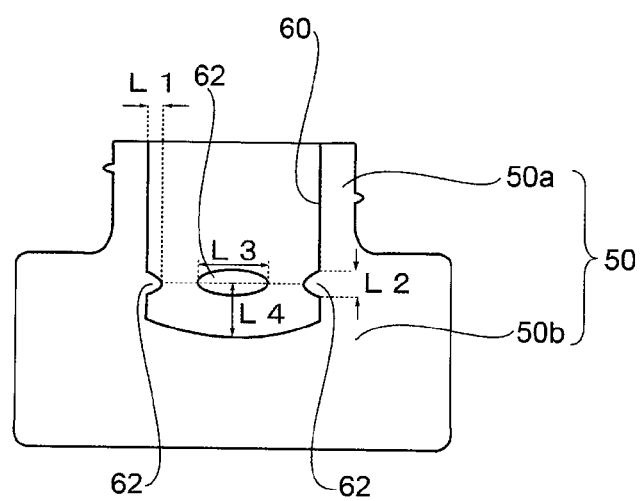
FIGS. 2(a) to 2(c) are diagrams illustrating an aspect of an inner peripheral surface of the glass container of the invention.
Figure 2B:
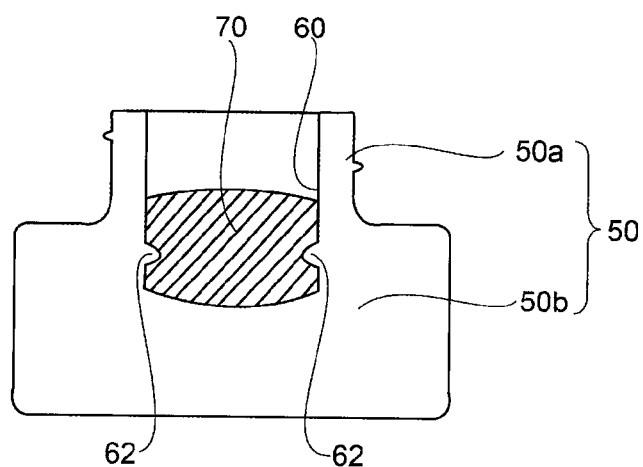
Figure 2C:
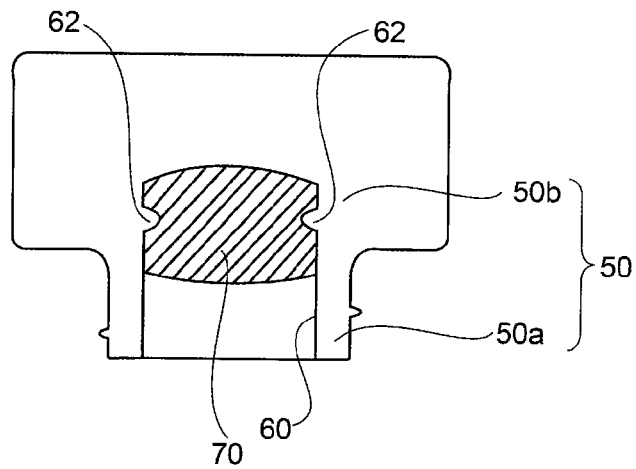

Further, since the glass container of the invention is obtained by the one-press manufacturing method, the inner diameter of the mouth portion 50*a* is substantially equal to the inner diameter of the main body 50*b* as illustrated in FIG. 2(*a*).

Accordingly, for example, when a cream-like material such as cosmetics is stored in the glass container, contents adhering to a portion, which is close to the mouth portion, of the main body of the glass container can be easily taken out.

Meanwhile, FIG. 2(*a*) is a cross-sectional view of the glass container 50 illustrated in FIGS. 1(*a*) to 1(*c*) when the glass container 50 illustrated in FIG. 1(*c*) is cut along a dotted line A-A in a vertical direction and the cross-section of the glass container is viewed in a direction of an arrow.

Further, the glass container of the invention is manufactured by a plunger, which includes predetermined unevenness forming members, as described below.

For this reason, as illustrated in FIG. 2(*a*), the glass container 50 of the invention includes uneven shapes 62 on an inner peripheral surface 60.

Accordingly, foundation, eye shadow, or the like is put in the glass container 50 and is stored in the form of a lump as illustrated in FIG. 2(*b*) by being pressed from above. For this reason, it is possible to effectively suppress the falling of a lump 70 of the stored material, such as foundation or eye shadow, to the outside of the container even though the glass container 50 is inverted as illustrated in FIG. 2(*c*).

Since the lump 70 of the stored material is caught by the uneven shapes 62 formed on the inner peripheral surface 60 of the glass container 50, this effect is obtained.

Figure 3A:
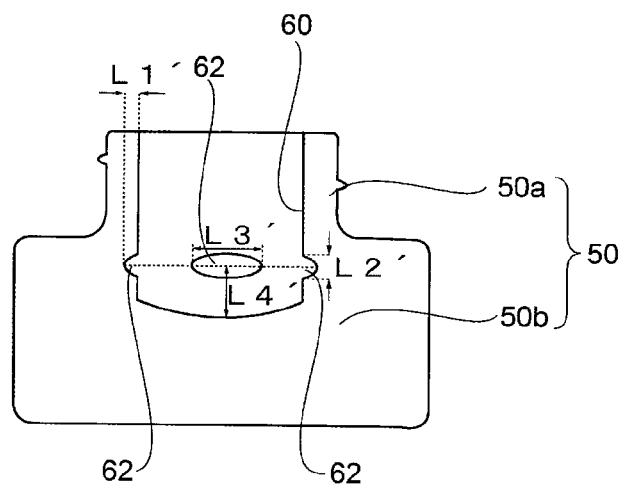
FIGS. 3(a) to 3(c) are other diagrams illustrating an aspect of the inner peripheral surface of the glass container of the invention.
Figure 3B:
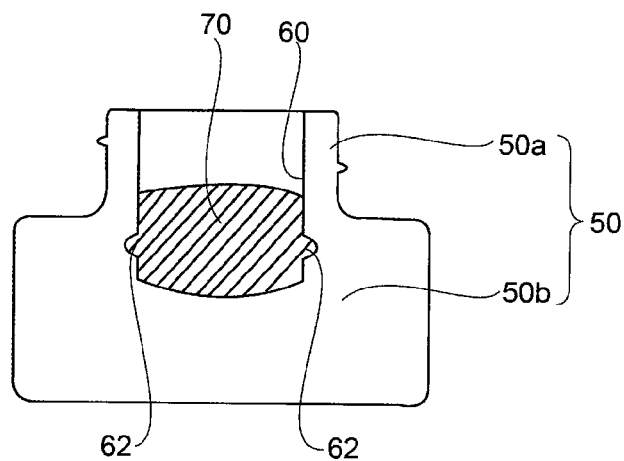
Figure 3C:
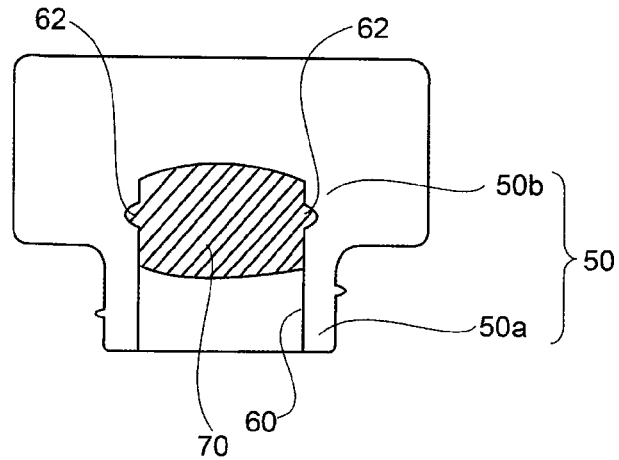

Meanwhile, a case in which each uneven shape 62 is a convex shape is illustrated in FIGS. 2(*a*) to 2(*c*), but the same effect can be obtained even though each uneven shape 62 is a concave shape as illustrated in FIGS. 3(*a*) to 3(*c*).

Further, it is preferable that the planar shape of each uneven shape 62 is an elliptical shape or a rectangular shape extending in a lateral direction as illustrated in FIGS. 2(*a*) and 3(*a*).

The reason for this is that each uneven shape having a sufficient length along the inner periphery of the glass container may be formed when the planar shape of each uneven shape is such a shape.

Accordingly, since the lump of the stored material is effectively caught by the uneven shapes even though the glass container is inverted, it is possible to effectively suppress the falling of the lump of the stored material to the outside of the container.

Meanwhile, the planar shape of the uneven shape is not limited to the elliptical shape or the rectangular shape extending in the lateral direction, and may be any shape, such as an elliptical shape, a triangular shape, or the shape of a dotted line.

Figure 4:
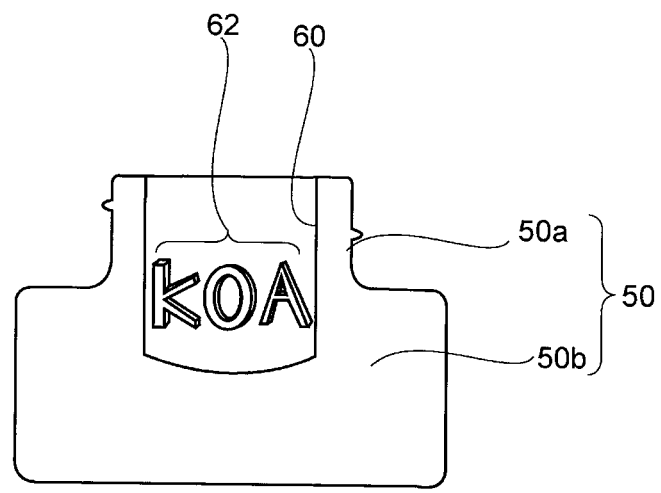
FIG. 4 is another diagram illustrating an aspect of the inner peripheral surface of the glass container of the invention.

Further, as illustrated in FIG. 4, the planar shape of the uneven shape 62 may be the shape of a letter, a design, or the like.

Furthermore, when each uneven shape 62 is a convex shape as illustrated in FIG. 2(*a*), the cross-sectional shape of the convex shape is not particularly limited as long as being a shape that can be formed. The cross-sectional shape of the convex shape may be a convex shape of which the apex is rounded, a convex shape of which the apex is sharp, or an angled convex shape.

Figure 1C:
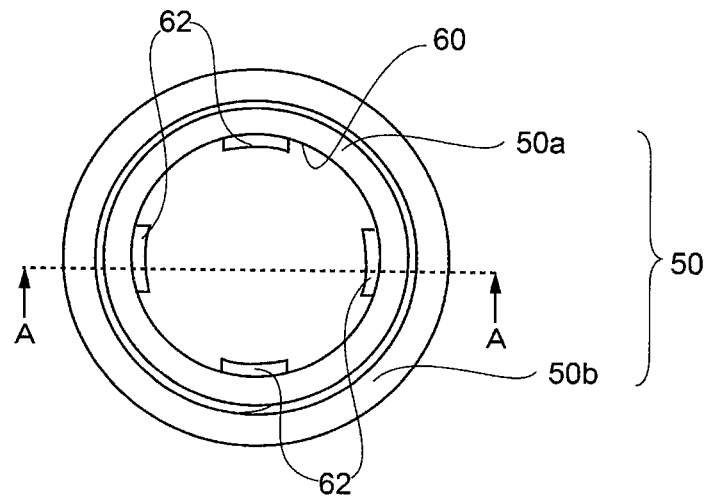

Moreover, in regard to the disposition of the convex shapes when each uneven shape is a convex shape, it is preferable that the convex shapes are disposed at regular intervals on the inner peripheral surface 60 of the glass container 50 as illustrated in FIG. 1(c) and it is preferable that the number of the convex shapes is generally within the range of 2 to 4.

Further, when each uneven shape 62 is a convex shape as illustrated in FIG. 2(a), it is preferable that the height L1 of each convex shape from the inner peripheral surface 60 is set to a value within the range of 0.4 to 5 mm.

The reason for this is that there is a concern that the lump of the stored material is likely to fall to the outside of the container since the degree of the catch between the lump of the stored material, such as foundation or eye shadow, and the convex shapes is excessively reduced when the glass container is inverted if the height L1 of each convex shape is smaller than 0.4 mm. Meanwhile, the reason for this is that it may be difficult to mold the convex shape when the height L1 of each convex shape is set to a value exceeding 5 mm.

Accordingly, when each uneven shape is a convex shape, the height L1 of each convex shape from the inner peripheral surface is more preferably set to a value within the range of 0.5 to 3 mm and is still more preferably set to a value within the range of 0.6 to 1.5 mm.

Further, when each uneven shape 62 is a convex shape as illustrated in FIG. 2(a), it is preferable that the width L2 of each convex shape is set to a value within the range of 0.5 to 4 mm.

The reason for this is that each convex shape is excessively likely to be broken when the width L2 of each convex shape is set to a value smaller than 0.5 mm. Meanwhile, the reason for this is that the lump of the stored material is likely to fall to the outside of the container since the degree of the catch between the lump of the stored material, such as foundation or eye shadow, and the convex shapes is excessively reduced when the glass container is inverted if the width L2 of each convex shape is set to a value exceeding 4 mm.

Accordingly, when each uneven shape is a convex shape, the width L2 of each convex shape is more preferably set to a value within the range of 0.7 to 3 mm and is still more preferably set to a value within the range of 1 to 2 mm.

Further, when each uneven shape 62 is a convex shape as illustrated in FIG. 2(a), it is preferable that the length L3 of each convex shape is set to a value within the range of 2 to 30 mm.

The reason for this is that the lump of the stored material is likely to fall to the outside of the container since the degree of the catch between the lump of the stored material, such as foundation or eye shadow, and the convex shapes is excessively reduced when the glass container is inverted if the length L3 of each convex shape is set to a value smaller than 2 mm. Meanwhile, the reason for this is that defects are likely to occur in the glass container since the distribution of the temperature of the plunger becomes excessively nonuniform during the molding of the convex shapes if the length L3 of each convex shape is set to a value exceeding 30 mm.

Accordingly, when each uneven shape is a convex shape, the length L3 of each convex shape is more preferably set to a value within the range of 5 to 25 mm and is still more preferably set to a value within the range of 10 to 20 mm.

Meanwhile, in terms of the prevention of the occurrence of the above-mentioned defects, it is preferable that the sum of the lengths L3 of the convex shapes is about a half of the inner peripheral length of the glass container.

Further, when each uneven shape 62 is a convex shape as illustrated in FIG. 2(a), it is preferable that the height L4 of each convex shape from the bottom of the bottle is set to a value within the range of 4 to 20 mm.

The reason for this is that the lump of the stored material is likely to fall to the outside of the container since the degree of the catch between the lump of the stored material, such as foundation or eye shadow, and the convex shapes is excessively reduced when the glass container is inverted if the height L4 of each convex shape from the bottom of the bottle is set to a value smaller than 4 mm. Meanwhile, the reason for this is that a trouble in manufacturing is likely to occur since the convex shapes come into contact with a press when foundation, eye shadow, or the like is put in the glass container and is stored in the form of a lump by being pressed from above if the height L4 of each convex shape from the bottom of the bottle is set to a value exceeding 20 mm.

Accordingly, when each uneven shape is a convex shape, the height L4 of each convex shape from the bottom of the bottle is more preferably set to a value within the range of 4.5 to 15 mm and is still more preferably set to a value within the range of 5 to 10 mm.

Furthermore, even when each uneven shape 62 is a concave shape as illustrated in FIG. 3(a), the cross-sectional shape of the concave shape is not particularly limited as long as being a shape that can be formed. The cross-sectional shape of the concave shape may be a concave shape of which the apex is rounded, a concave shape of which the apex is sharp, or an angled concave shape.

Moreover, even in regard to the disposition of the concave shapes, as in a case in which each uneven shape is a convex shape, it is preferable that the concave shapes are disposed at regular intervals on the inner peripheral surface of the glass container and it is preferable that the number of the concave shapes is generally within the range of 2 to 4.

Further, even though each uneven shape 62 is a concave shape as illustrated in FIG. 3(a), the depth L1' of each concave shape from the inner peripheral surface 60 is preferably set to a value within the range of 0.4 to 5 mm, is set more preferably set to a value within the range of 0.5 to 3 mm, and is still more preferably set to a value within the range of 0.6 to 1.5 mm for the same reason as in a case in which each uneven shape 62 is a convex shape.

Furthermore, likewise, the width L2' of each concave shape is preferably set to a value within the range of 0.5 to 4 mm, is set more preferably set to a value within the range of 0.7 to 3 mm, and is still more preferably set to a value within the range of 1 to 2 mm.

Moreover, likewise, the length L3' of each concave shape is preferably set to a value within the range of 2 to 30 mm, is set more preferably set to a value within the range of 5 to 25 mm, and is still more preferably set to a value within the range of 10 to 20 mm.

In addition, likewise, the height L4' of each concave shape from the bottom of the bottle is preferably set to a value within the range of 4 to 20 mm, is set more preferably set to a value within the range of 4.5 to 15 mm, and is still more preferably set to a value within the range of 5 to 10 mm.

(2) Material

Further, the type of glass, which forms the glass container, is also not particularly limited, and examples of the glass include soda-lime glass, borosilicate glass, lead glass, phosphate glass, aluminosilicate glass, and the like.

Furthermore, it is preferable that colorless transparent glass is used as the glass forming the glass container, but it is also preferable that colored transparent glass or colored translucent glass is used as the glass forming the glass container.

When colorless transparent glass is used, it is possible to sufficiently recognize the color of contents stored in the glass container from the outside and to clearly recognize the color of the contents by using the internal reflection of light.

Meanwhile, when colored transparent glass or colored translucent glass is used, it is possible to obtain a glass container that is more excellent in decorativeness through the introduction of the color of contents by using the internal reflection of light.

2. Outline of One-Press Manufacturing Method

The one-press manufacturing method for a glass container of the invention includes predetermined steps (A) to (E).

Accordingly, after the outline of the respective steps is described first with reference to FIGS. 5 to 9, a one-press manufacturing apparatus for a glass container and a glass container, a plunger, a blow head, a cooling mold, and the like of the one-press manufacturing apparatus for a glass container will be described specifically.

Meanwhile, all of FIGS. 5 to 9 are cross-sectional views that are obtained when a glass container 32 having a finished shape, a pressing mold 11, a plunger 100, and the like in each step are cut in a vertical direction.

Figure 5A:
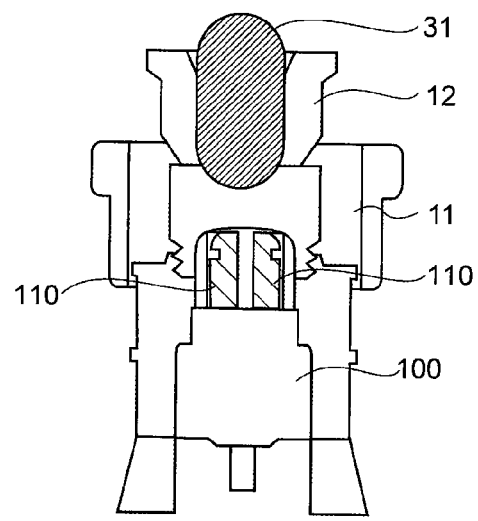
FIGS. 5(a) to 5(c) are diagrams illustrating the outline of a step (A) of a one-press manufacturing method for a glass container of the invention.
Figure 5B:
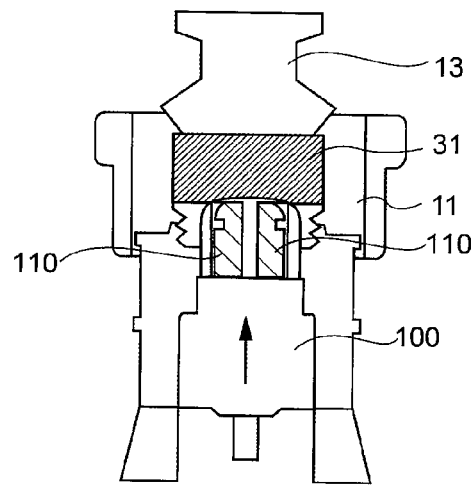
Figure 5C:
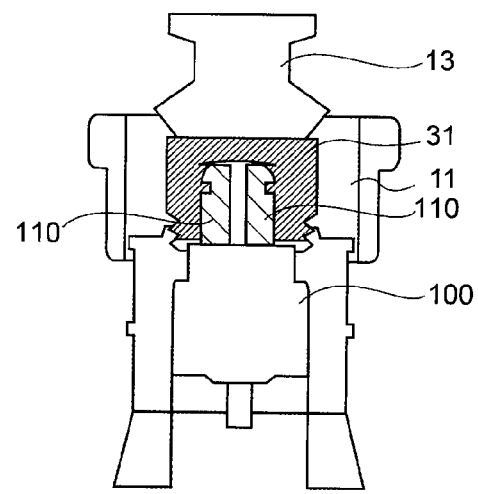

(1) Step (A) The step (A) is a step of putting a gob 31 in the pressing mold 11 as illustrated in FIG. 5(a) and then inserting the plunger 100, which includes unevenness forming members 110 provided so as to be capable of being received in the plunger, into the gob 31 while the unevenness forming members 110 are received in the plunger as illustrated in FIGS. 5(b) and 5(c).

More specifically, as illustrated in FIG. 5(a), the pressing mold 11 is installed and the gob 31 is put in the pressing mold 11 through a funnel 12.

After, as illustrated in FIGS. 5(b) and 5(c), the plunger 100 is inserted into the pressing mold 11 filled with the gob 31 after a baffle 13 is mounted instead of the funnel 12.

Accordingly, in the step (A), the plunger 100 is inserted into the gob 31 while the plunger 100 receives the unevenness forming members 110 therein. Therefore, a part of the gob 31, which comes into contact with the received unevenness forming members 110, enters the plunger 100.

(2) Step (B)

Figure 6A:
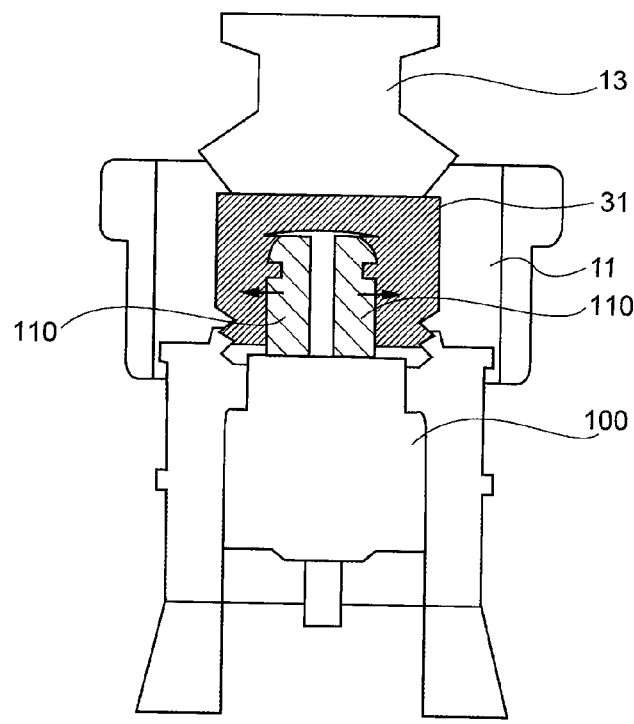
FIGS. 6(a) and 6(b) are diagrams illustrating the outline of a step (B) of the one-press manufacturing method for a glass container of the invention.
Figure 6B:
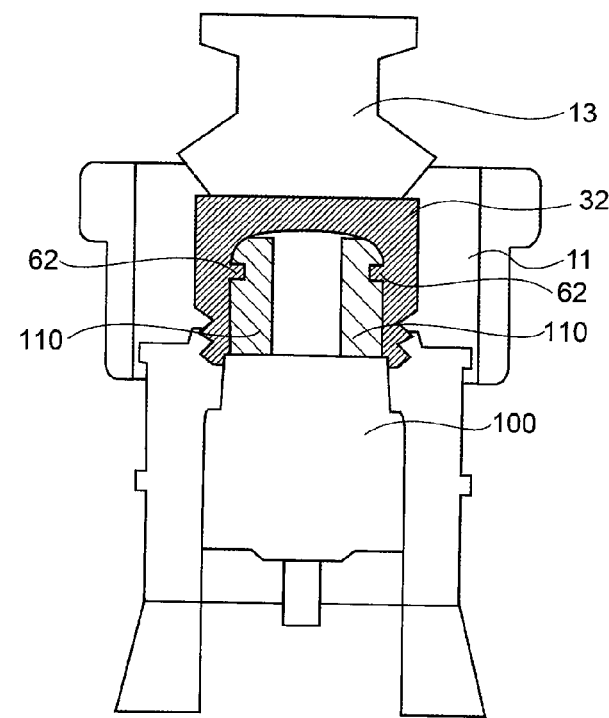

The step (B) is a step of molding a glass container 32 having a finished shape, which includes the uneven shapes 62 on the inner peripheral surface thereof, by pressing the unevenness forming members 110 against the surface of the gob 31, which comes into contact with the unevenness forming members 110, to the outside from the inside of the plunger 100 as illustrated in FIGS. 6(a) and 6(b).

In the step (B), the unevenness forming members 110 are pressed against the surface of the gob 31, which comes into contact with the unevenness forming members 110, to the outside from the inside of the plunger 100. Accordingly, a part of the gob 31, which enters the plunger 100, is extruded to the outside of the plunger 100 by the unevenness forming members 110.

Further, in this case, the uneven shapes 62 (convex shapes in the drawings) are formed on the surface of the gob 31, which comes into contact with the unevenness forming members 110, by uneven portions (concave portions in the drawings) that are formed on the contact surfaces of the unevenness forming members 110 coming into contact with the gob 31.

Furthermore, this state is maintained until the surface of the gob 31 is cooled so as to have a predetermined shape.

Accordingly, the glass container 32 having a finished shape, which includes the uneven shapes 62 (convex shapes in the drawings) on the inner peripheral surface thereof, is molded at this point of time.

(3) Step (C)

Figure 7A:
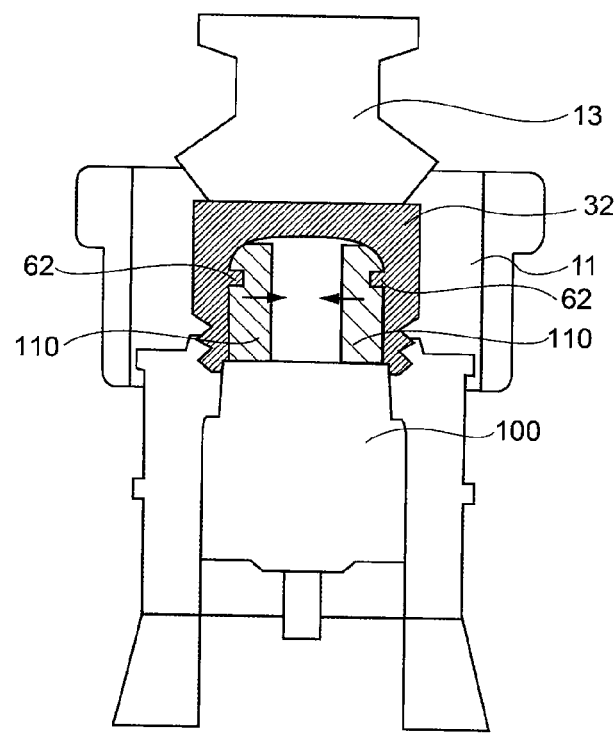
FIGS. 7(a) and 7(b) are diagrams illustrating the outline of a step (C) of the one-press method manufacturing for a glass container of the invention.
Figure 7B:
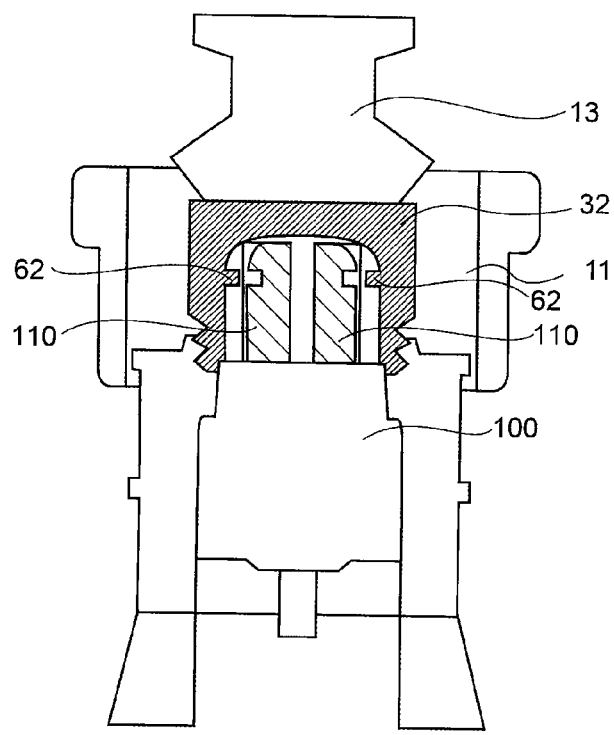

The step (C) is a step of receiving the unevenness forming members 110 in the plunger 100 as illustrated in FIGS. 7(a) and 7(b).

In the step (C), the unevenness forming members 110, which press the gob to the outside from the inside of the plunger 100, are received in the plunger 100 again. Accordingly, the unevenness forming members 110 are separated from the inner peripheral surface of the glass container 32 having a finished shape, and the uneven shapes 62 (convex shapes in the drawings) formed on the inner peripheral surface of the glass container 32 having a finished shape are maintained without change.

(4) Step (D)

Figure 8A:
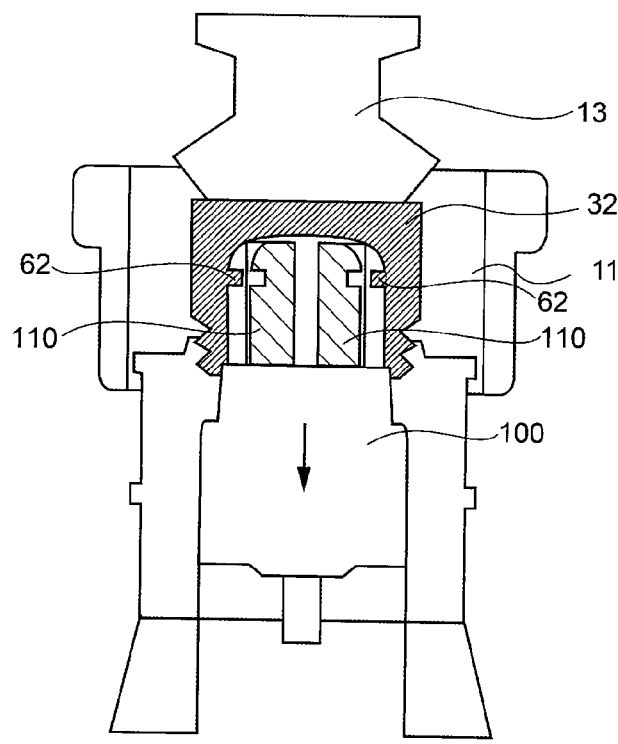
FIGS. 8(a) and 8(b) are diagrams illustrating the outline of a step (D) of the one-press manufacturing method for a glass container of the invention.
Figure 8B:
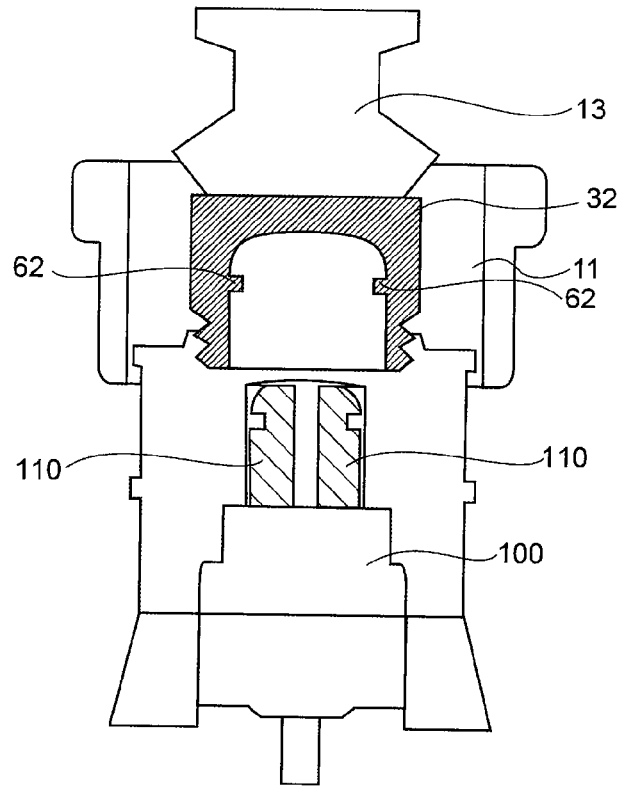

The step (D) is a step of extracting the plunger 100, in which the unevenness forming members 110 are received, from the glass container 32 having a finished shape that includes the uneven shapes 62 (convex shapes in the drawings) on the inner peripheral surface thereof as illustrated in FIGS. 8(a) and 8(b).

In the step (D), the unevenness forming members 110 are already received in the plunger 100. The uneven shapes 62 (convex shapes in the drawings) formed on the inner peripheral surface of the glass container 32 having a finished shape do not come into contact with the plunger 100 and the plunger 100 can be extracted from the glass container 32 having a finished shape.

Accordingly, the uneven shapes 62 (convex shapes in the drawings) formed on the inner peripheral surface of the glass container 32 having a finished shape are maintained without change.

(5) Step (E)

Figure 9A:
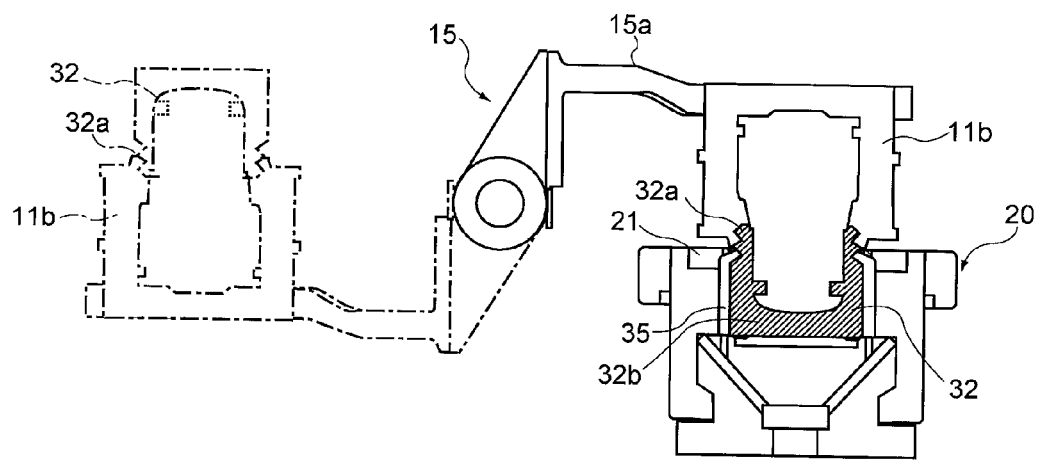
FIGS. 9(a) and 9(b) are diagrams illustrating the outline of a step (E) of the one-press manufacturing method for a glass container of the invention.
Figure 9B:
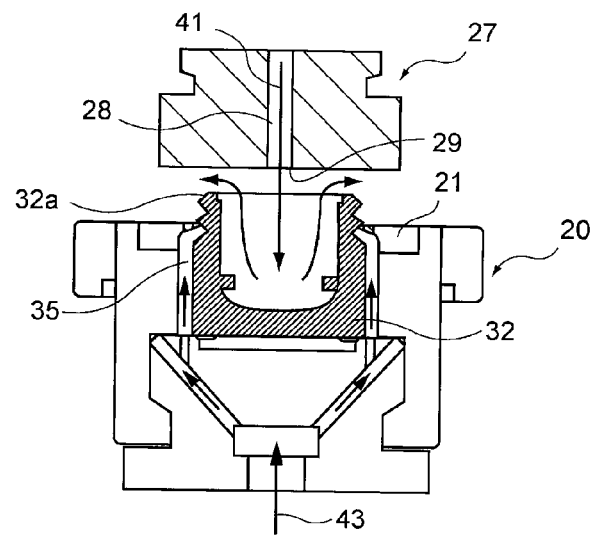

The step (E) is a step of transporting the glass container 32 having a finished shape, which includes the uneven shapes 62 (convex shapes in the drawings) on the inner peripheral surface thereof, to the cooling mold 20 and cooling the glass container 32 having a finished shape as illustrated in FIGS. 9(a) to 9(b).

First, as illustrated in FIG. 9(a), the glass container 32 having a finished shape is rotationally moved by an angle of 180° in the vertical direction with a rotating device 15, which includes an arm 15a, so as to be received in the cooling mold 20.

More specifically, while a mouth portion 32a of the glass container 32 having a finished shape is supported by a mouth mold 11b that is a part of the pressing mold 11 and is connected to the arm 15a, the glass container 32 having a finished shape is rotationally moved in the vertical direction and is received and held in the cooling mold 20 so that a gap 35 is formed between the outer peripheral surface of the glass container 32 having a finished shape and the cooling mold 20.

In this case, the mouth portion 32a of the glass container 32 having a finished shape, which is transported to the cooling mold 20, is supported by a support 21 of the cooling mold 20, and a bottom portion 32b thereof is placed on a placement portion 22.

Next, a blow head 27 is disposed above the cooling mold 20 as illustrated in FIG. 9(b).

In this case, the blow head 27 is disposed so as to be separated from the mouth portion 32a of the glass container 32 having a finished shape and the support 21 that supports the mouth portion 32a of the glass container 32 having a finished shape.

Next, as illustrated in FIG. 9(b), predetermined first cooling air 41 is blown into the glass container 32 having a finished shape through the blow head 27 that is disposed above the cooling mold 20.

Further, second cooling air 43 is introduced into the gap 35, which is formed between the outer peripheral surface of the glass container 32 having a finished shape and the cooling mold 20. Accordingly, the second cooling air is indirectly blown to the glass container 32 having a finished shape without being directly blown to the glass container 32 having a finished shape.

Therefore, the glass container 32 having a finished shape is efficiently cooled from the outer peripheral surface and the inner surface thereof, so that a final glass container 50 is obtained.

3. Manufacturing Apparatus for Glass Container

Figure 10:
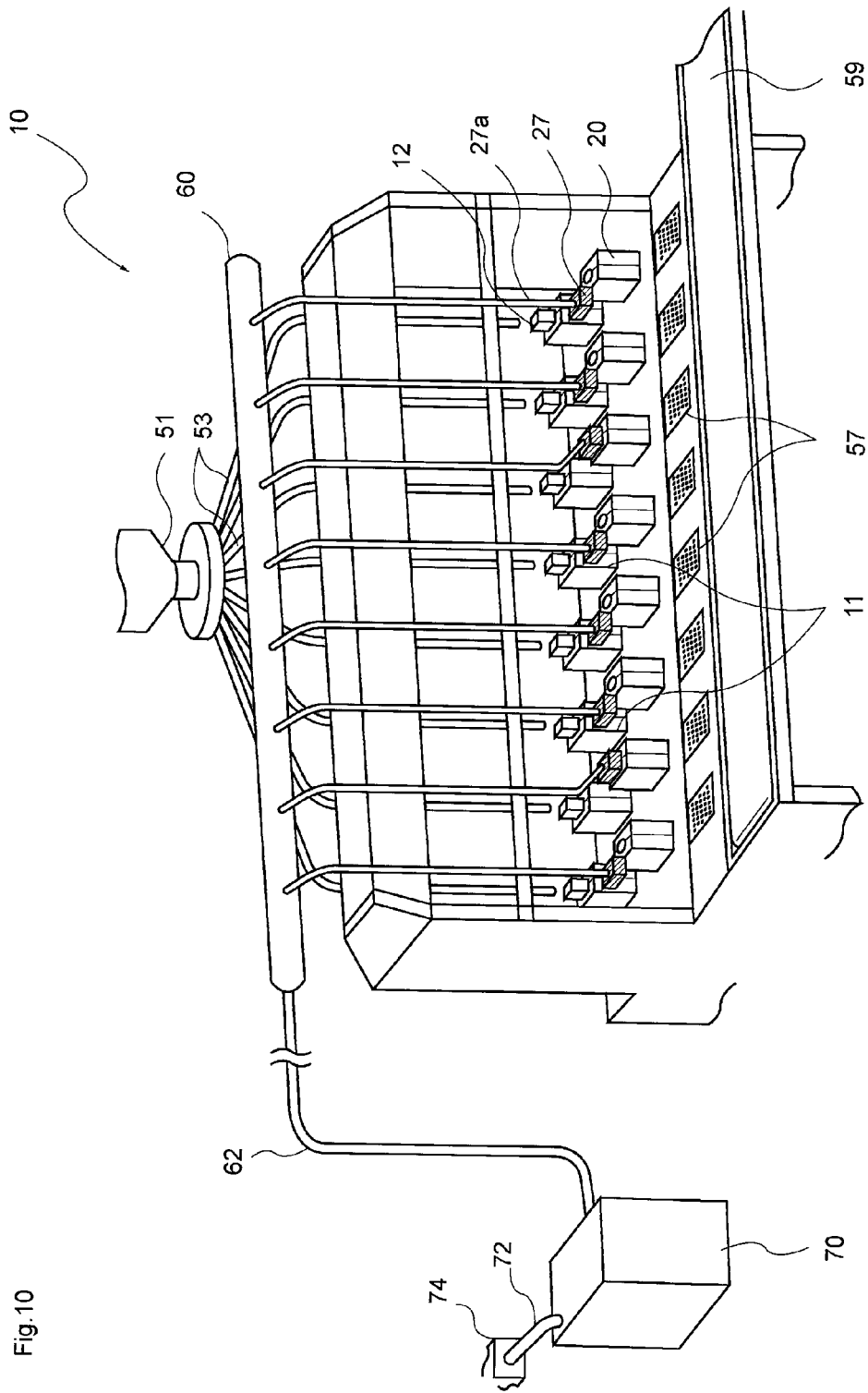
FIG. 10 is a diagram illustrating the one-press manufacturing apparatus for a glass container.

As illustrated in FIG. 10, an individual section machine (IS machine) 10 can be basically used as the one-press manufacturing apparatus for a glass container that performs the one-press manufacturing method for a glass container of the invention.

The IS machine is adapted to use a predetermined pressing mold 11 and to cool the glass container having a finished shape by the first cooling air blown from the blow head 27 and the second cooling air blown along the inner peripheral surface of the cooling mold 20 after transporting the glass container having a finished shape, which is molded by the pressing mold 11, to the cooling mold 20.

That is, the IS machine is a one-press manufacturing apparatus for a glass container that can manufacture a predetermined glass container by only cooling the glass container having a finished shape in the cooling mold after forming the glass container having a finished shape by one-time press.

Accordingly, according to the IS machine, it is possible to easily and continuously manufacture the glass container 50 having a specific shape that which has a thickness where the inner diameters of the mouth portion and the main body are equal to each other as illustrated in, for example, FIG. 1 and has excellent decorativeness.

Meanwhile, FIG. 10 is a perspective view of the IS machine 10.

(1) Mold

Figure 11:
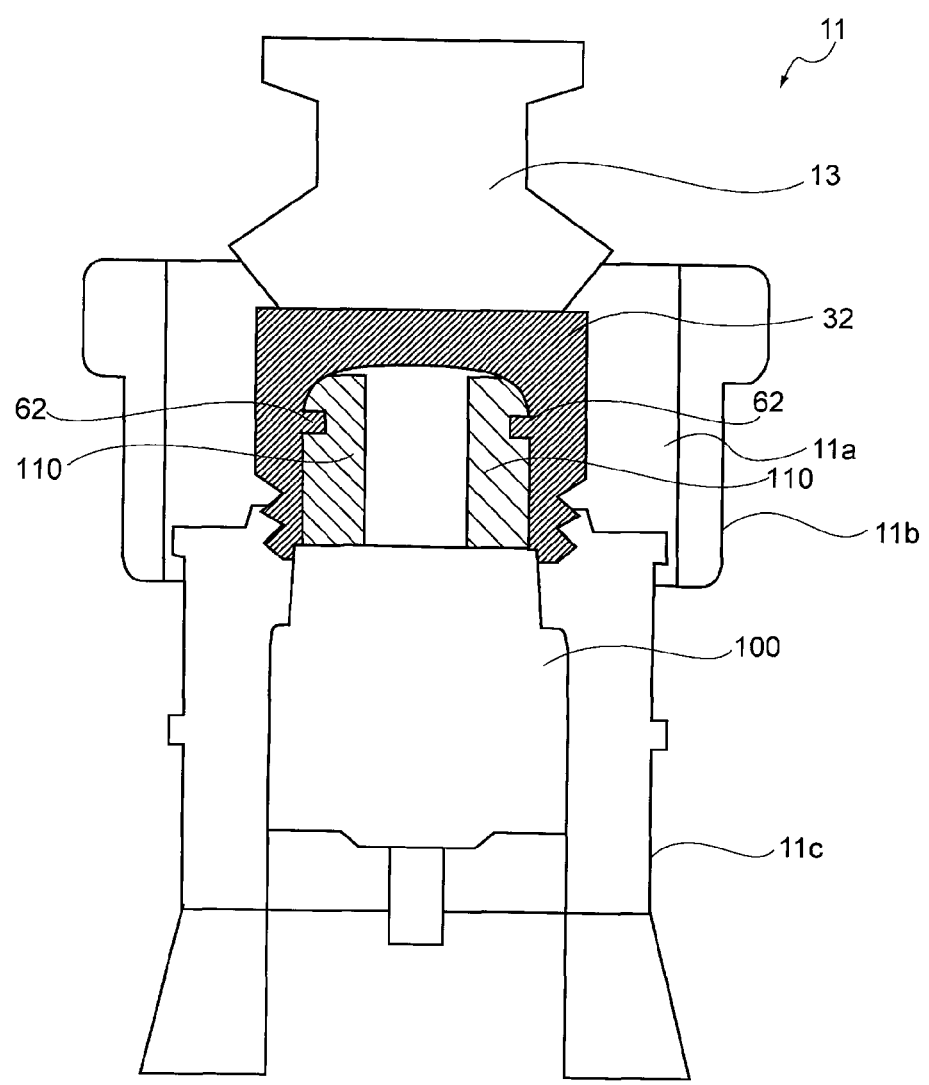
FIG. 11 is a diagram illustrating a pressing mold.

First, the pressing mold 11 (11a, 11b, and 11c) illustrated in FIG. 11 is a mold that is used to mold a parison 32 having a finished shape with high accuracy and high productivity by the press molding that is performed by the plunger 100 as illustrated in FIGS. 5 to 8.

The pressing mold is made of iron, an iron alloy, brass, a copper-nickel alloy, or the like, and the shape of the pressing mold may be appropriately changed according to the shape of the appearance of a glass container to be manufactured.

Meanwhile, FIG. 11 is a cross-sectional view that is obtained when the pressing mold 11, the plunger 100, and the like are cut in the vertical direction.

Further, it is preferable that mold release processing is performed on the inner surface of the pressing mold. For example, it is preferable that a lining made of a nickel alloy or the like is provided or nickel plating is performed on the inner surface of the pressing mold and a mold release agent is further applied.

The reason why the mold release processing is performed as described above is that the deformation of the glass container having a finished shape, which occurs since the glass container adheres to the pressing mold and is pulled, can be prevented when the glass container having a finished shape is taken out of the pressing mold.

Further, it is preferable that the pressing mold can be cooled from the outside so that the pressing mold and the glass container having a finished shape are not welded to each other (are not burned and do not stick to each other).

Furthermore, the temperature of the pressing mold can be determined in consideration of the moldability, appearance characteristics, economic efficiency, or the like of the glass container having a finished shape. Generally, it is preferable that the temperature of the pressing mold is set to a value within the range of 400 to 700° C.

The reason for this is that the glass container having a finished shape may be molded by one-time press without being excessively distorted and the deterioration of appearance of the glass container occurring during the cooling of the glass container or the number of uneven portions formed on the surface of the glass container may be reduced even though the glass container includes the thickest portion having a thickness of a predetermined value or more when the temperature of the pressing mold is set to a value within a predetermined range as described above.

More specifically, the reason for this is that the appearance of the glass container may deteriorate or the number of uneven portions formed on the surface of the glass container may be increased in a cooling step since the moldability of the glass container having a finished shape excessively deteriorates when the temperature of the pressing mold is lower than 400° C.

Meanwhile, the reason for this is that the appearance of the glass container may deteriorate or the number of uneven portions formed on the surface of the glass container may be increased in a cooling step since the moldability or coolability of the glass container having a finished shape is insufficient conversely when the temperature of the pressing mold exceeds 700° C.

Accordingly, the temperature of the pressing mold is more preferably set to a value within the range of 450 to 680° C. and is still more preferably set to a value within the range of 500 to 650° C.

Meanwhile, the temperature of the pressing mold can be directly measured by various temperature sensors, or can be indirectly measured by using thermography.

(2) Plunger

Figure 12A:
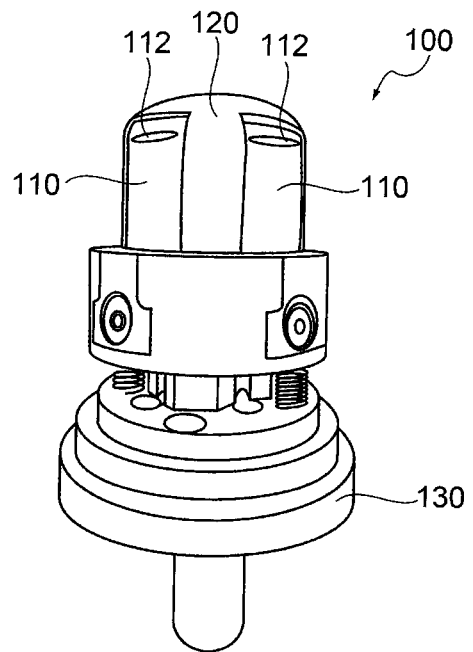
FIGS. 12(a) and 12(b) are diagrams illustrating a plunger.
Figure 12B:
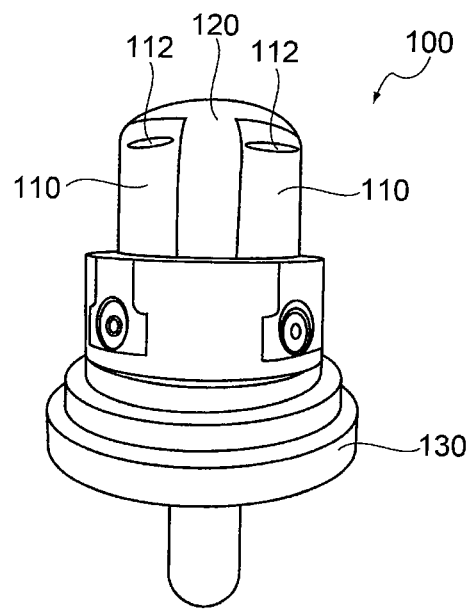

Further, the plunger 100 illustrated in FIGS. 12(a) and 12(b) is a member that is to be extracted after being pressed into the gob 31 filled in the pressing mold 11 as illustrated in FIGS. 5 to 8.

The plunger is made of iron, an iron alloy, brass, a copper-nickel alloy, or the like, and the shape of the plunger may be appropriately changed according to the internal shape of a glass container to be manufactured.

However, since the plunger needs to be extracted without damage to the internal shape of the glass container having a finished shape after the plunger is pressed into the gob, it is preferable that the plunger is formed in a basically columnar or a columnar shape inclined toward the tip thereof.

Furthermore, since the tip portion of the plunger serves as a molding surface for the bottom of the bottle, it is preferable that the tip portion of the plunger is rounded.

Meanwhile, FIGS. 12(a) and 12(b) are perspective views illustrating the shape of the entire plunger 100.

Further, as illustrated in FIGS. 12(a) and 12(b), the plunger 100, which is used in the one-press manufacturing method for a glass container of the invention includes the unevenness forming members 110 that are provided so as to be capable of being received in the plunger.

That is, a state in which the unevenness forming members 110 are received in the plunger 100 as illustrated in FIG. 12(a) and a state in which the unevenness forming members 110 are pressed outward from the inside of the plunger 100 as illustrated in FIG. 12(b) can be alternately switched.

The reason for this is that uneven shapes may be formed on the inner peripheral surface of the glass container as illustrated in FIGS. 5 to 8 in spite of the one-press manufacturing method when the plunger including the unevenness forming members is used.

Accordingly, in spite of the one-press manufacturing method, it is possible to manufacture a glass container that effectively suppresses the falling of a lump of the stored material, such as foundation or eye shadow, to the outside of the container even though the glass container is inverted. In addition, it is also possible to form uneven shapes, which have excellent design, on the inner peripheral surface of the glass container.

Figure 13A:
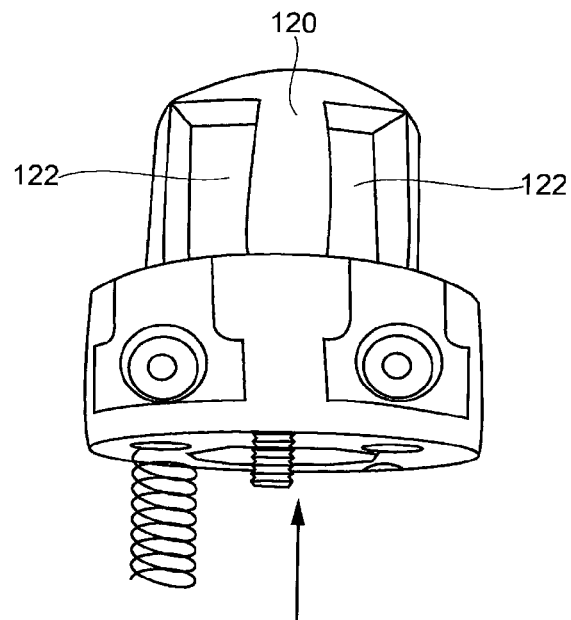
FIGS. 13(a) to 13(c) are diagrams illustrating the respective components of the plunger.
Figure 13B:
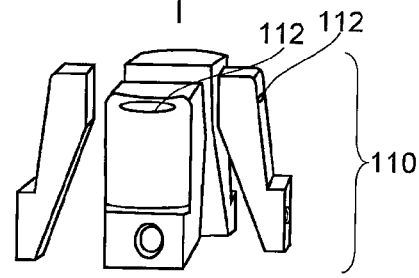
Figure 13C:
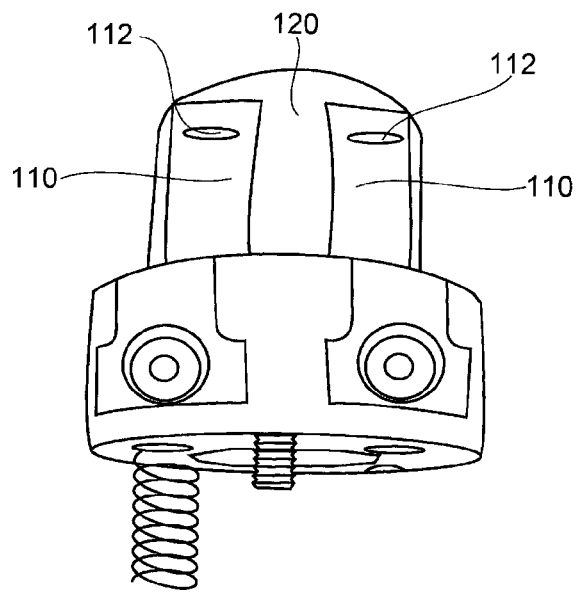

Further, it is preferable that the plunger 100 includes the unevenness forming members 110, a molding surface member 120 including opening portions 122 receiving the unevenness forming members 110 as illustrated in FIGS. 13(a) to 13(c), and a pressing member 130 that is movably fitted to the molding surface member 120 as illustrated in FIGS. 14(a) to 14(c).

Furthermore, it is preferable that the pressing member 130 includes inclined surfaces 132 which are inclined toward the tip of the plunger 100 as illustrated in FIG. 14(b).

Figure 15A:
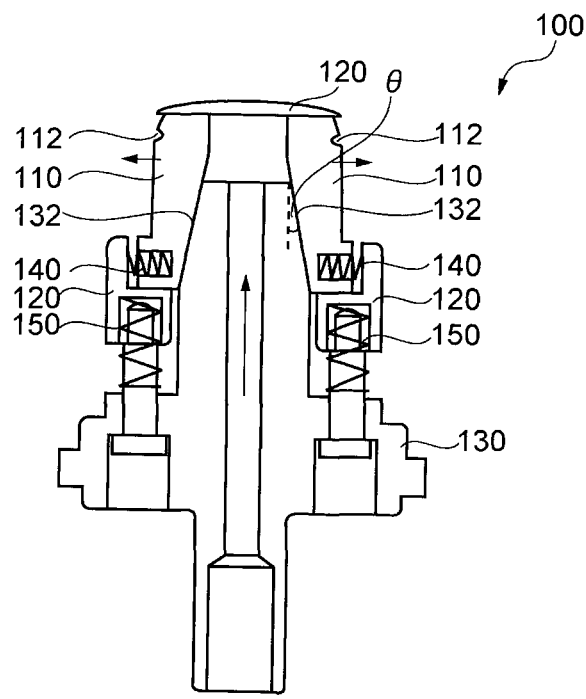
FIGS. 15(a) and 15(b) are other diagrams illustrating the mechanism of the plunger.
Figure 15B:
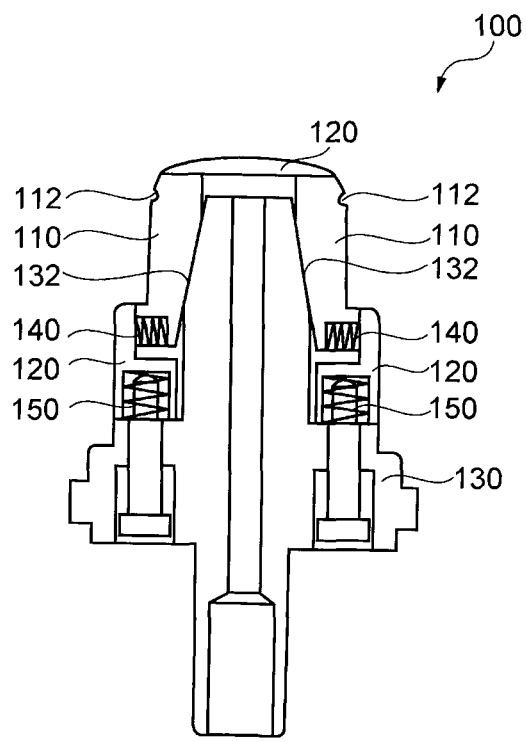

The reason for this is that the unevenness forming members 110 may be pressed to the outside from the inside of the plunger 100 through the opening portions 122 of the molding surface member 120 when the pressing member 130 is pressed into the molding surface member 120 as illustrated in FIGS. 15(a) and 15(b) if the plunger is formed as described above.

As a result, as illustrated in FIGS. 5 to 8, it is possible to form uneven shapes on the inner peripheral surface of the glass container having a finished shape by more stably pressing the unevenness forming members against the surface of the gob, which comes into contact with the unevenness forming members, to the outside from the inside of the plunger.

Meanwhile, FIGS. 13(a) to 13(c) are perspective views illustrating a combination of the unevenness forming members 110 and the molding surface member 120 of the plunger 100, and FIGS. 14(a) to 14(c) are perspective views illustrating a combination of a portion of the plunger 100, which includes the unevenness forming members 110 and the molding surface member 120, and the pressing member 130.

Further, FIGS. 15(a) and 15(b) are cross-sectional views that are obtained when the plunger 100 is cut in the vertical direction.

That is, since the plunger is formed so as to have a structure illustrated in FIGS. 13 and 14, the side surface of a rod-like portion of the pressing member 130 extrudes the inner surfaces of the unevenness forming members 110 to the outside from the inside of the plunger 100 as the pressing member 130 is pressed into the molding surface member 120 as illustrated in FIGS. 15(a) and 15(b).

Particularly, since the side surface of the rod-like portion of the pressing member 130 includes the inclined surfaces 132 which are inclined toward the tip of the plunger 100, the inclined surfaces 132 can gradually extrude the unevenness forming members 110 to the outside from the inside of the plunger 100 while stably sliding on the inner surfaces of the unevenness forming members 110.

Accordingly, in terms of the further stabilization of the slidability between the inclined surfaces 132 and the inner surfaces of the unevenness forming members 110, it is preferable that the inner surfaces of the unevenness forming members 110 include inclined surfaces that have the same inclination angles as the inclination angles of the inclined surfaces as illustrated in FIGS. 15(a) and 15(b).

In addition, in terms of the suppression of the deterioration of the above-mentioned slidability that is caused by the thermal expansion or the like of each member, it is preferable that each of the inclined surfaces 132 of the pressing member 130 and the inclined surfaces of the inner surfaces of the unevenness forming members 110 is formed of a simple flat surface.

The reasons for this is that the unevenness forming members 110, which are heated by coming into direct contact with the gob, may be significantly thermally expanded, the internal pressure in the fitting between the grooves and the unevenness forming members may be increased, and thus it may be difficult to smoothly slide the unevenness forming members 110, for example, when the unevenness forming members 110 are formed so as to be slidably fitted to grooves formed on the inclined surfaces of the pressing member 130.

Further, when an angle between the axis of the pressing member 130 and a vertical line is set to 0° as illustrated in FIG. 15(a), it is preferable that an inclination angle θ of each inclined surface 132 is set to a value within the range of 1 to 60°.

The reason for this is that it may be difficult to efficiently extrude the unevenness forming members to the outside from the inside of the plunger by pressing the pressing member when the inclination angle θ is set to a value smaller than 1°. Meanwhile, the reason for this is that it may be difficult to stably extrude the unevenness forming members to the outside from the inside of the plunger by pressing the pressing member since the slidability between the inclined surfaces and the inner surfaces of the unevenness forming members excessively deteriorates, particularly, when the unevenness forming members are thermally expanded or the like, if the inclination angle θ exceeds 60°.

Accordingly, the inclination angle θ is more preferably set to a value within the range of 5 to 30° and is still more preferably set to a value within the range of 10 to 15°.

Furthermore, it is preferable that the plunger 100 includes the plurality of unevenness forming members 110 and the pressing member 130 includes the inclined surfaces 132 of which the number is equal to the number of the unevenness forming members 110 as illustrated in FIGS. 13 and 14.

The reason for this is that it is possible to form the uneven shapes on the inner peripheral surface of the glass container by more efficiently pressing the unevenness forming members against the surface of the gob, which comes into contact with the unevenness forming members, to the outside from the inside of the plunger when the plunger is formed as described above.

Meanwhile, FIGS. 13 and 14 illustrates an aspect in which the plunger 100 includes four unevenness forming members 110 and the pressing member 130 includes four inclined surfaces 132 of which the number is equal to the number of the unevenness forming members 110.

Here, the inclined surfaces 132 of the pressing member 130 illustrated in FIG. 14(b) are provided with cooling air grooves 134 as described below, but the number of the inclined surfaces 132 is counted without including portions that are divided by the cooling air grooves 134.

Further, it is preferable that the unevenness forming members 110 are biased by first spring members 140 as illustrated in FIGS. 15(a) and 15(b).

The reason for this is that the unevenness forming members 110 may be automatically maintained so as to be received in the opening portions 122 of the molding surface member 120 except when the pressing member 130 is pressed into the molding surface member 120 if the first spring members 140 are provided as illustrated in FIGS. 15(a) and 15(b).

Accordingly, it is possible to more stably control the pressing of the unevenness forming members 110 against the surface of gob and the receiving of the unevenness forming members 110 in the opening portion 122 while allowing the movement of the pressing member 130 and the movement of the unevenness forming members 110 to interlock with each other.

Meanwhile, an aspect of the biasing of the unevenness forming members 110 performed by the first spring members 140 is not particularly limited as long as the unevenness forming members 110 are biased into the molding surface member 120. However, it is preferable that the lower portions of the unevenness forming members 110 are biased from the inner wall of the molding surface member 120 as illustrated in FIGS. 15(a) and 15(b).

Furthermore, it is preferable that the pressing member 130 is biased by second spring members 150 as illustrated in FIGS. 15(a) and 15(b).

The reason for this is that the unevenness forming members 110 may be automatically maintained so as to be received in the opening portions 122 of the molding surface member 120 by a biasing effect of the second spring members together with a biasing effect of the above-mentioned first spring members 140 except when the pressing member 130 is pressed into the molding surface member 120 if the second spring members 150 are provided as illustrated in FIGS. 15(a) and 15(b).

That is, since the pressing member 130 is automatically pushed and returned to the outside of the molding surface member 120 except when the pressing member 130 is pressed into the molding surface member 120, the unevenness forming members 110 can be automatically maintained so as to be received in the opening portions 122 of the molding surface member 120 by a biasing effect of the second spring members together with a biasing effect of the first spring members 140.

Accordingly, it is possible to more stably control the pressing of the unevenness forming members 110 against the surface of gob and the receiving of the unevenness forming members 110 in the opening portion 122 while reliably allowing the movement of the pressing member 130 and the movement of the unevenness forming members 110 to interlock with each other.

Meanwhile, an aspect of the biasing of the pressing member 130 performed by the second spring members 150 is not particularly limited as long as the pressing member 130 is biased so as to be separated from the molding surface member 120. However, it is preferable that the upper surface of the lower portion of the pressing member 130 is biased from the lower surface of the molding surface member 120 as illustrated in FIGS. 15(a) and 15(b).

Further, the contact surfaces of the unevenness forming members coming into contact with the surface of the gob include the uneven portions that form the uneven shapes on the inner peripheral surface of the glass container having a finished shape. However, the aspect of the uneven portion is not particularly limited.

Accordingly, it is preferable that the aspect of the uneven portion is, for example, an aspect of an uneven portion capable of forming the uneven shape formed on the inner peripheral surface of the glass container described in the subsection of the glass container.

That is, when, for example, predetermined convex shapes are to be formed on the inner peripheral surface of the glass container, the uneven portions may be predetermined concave portions complementary to the convex shapes.

Further, particularly, it is preferable that the unevenness forming members 110 include lateral grooves 112 on the contact surfaces thereof coming into contact with the surface of the gob as illustrated in FIG. 12 and the like.

The reason for this is as follows: when the unevenness forming members include the lateral grooves, elliptical or rectangular convex shapes extending in the lateral direction can be formed on the inner peripheral surface of the glass container. Accordingly, it is possible to more easily manufacture the glass container that suppresses the falling of the lump of the stored material, such as foundation or eye shadow, to the outside of the container even though being inverted.

Furthermore, it is preferable that, as illustrated in FIG. 14(b), the pressing member 130 includes a cooling-air introduction passage 135 formed in the pressing member 130 and cooling air holes 136 for allowing cooling air, which is present in the cooling-air introduction passage 135, to flow to the outside of the pressing member 130 and the inclined surfaces 132 of the pressing member 130 include the cooling air grooves 134 for allowing the cooling air, which flows out of the cooling air holes 136, to flow between the pressing member 130 and the unevenness forming members 110.

The reason for this is that the unevenness forming members 110, which come into direct contact with the gob and are easily heated, may be efficiently cooled from the inside and the reduction of the mobility of the unevenness forming members 110 caused by thermal expansion may be effectively suppressed when this structure is employed.

That is, the reason for this is that the mobility of the unevenness forming members 110 is likely to deteriorate since the slidability between the unevenness forming members 110 and the inclined surfaces 132 of the pressing member 130 is likely to deteriorate or the slidability between the unevenness forming members 110 and the inner walls of the opening portions 122 of the molding surface member 120 is likely to deteriorate when the unevenness forming members 110 are excessively thermally expanded.

Meanwhile, it is preferable that the diameters of the cooling-air introduction passage 135 and the cooling air hole 136 are generally set to a value within the range of 4 to 8 mm, and it is preferable that the width and thickness of the cooling air groove 134 are generally set to a value within the range of 2 to 5 mm.

Further, it is preferable that the temperature of the cooling air is generally set to a value within the range of 40 to 70° C., and it is preferable that the pressure of the cooling air is generally set to a value within the range of 0.14 to 0.18 MPa.

Meanwhile, an arrow in FIG. 14(b) indicates the flow of the cooling air.

Furthermore, when the total area of the opening portions of the molding surface member is denoted by S1 (mm$^2$) and the area of the inner portion of the glass container having a finished shape is denoted by S2 (mm²), it is preferable that S1/S2 is set to a value of 0.4 or less.

The reason for this is that it is possible to effectively suppress the carving of the contour shapes of the unevenness forming members in a linear shape on the inner peripheral surface of the glass container.

That is, the reason for this is that the contour shapes of the unevenness forming members are likely to be carved in a linear shape on the inner peripheral surface of the glass container since the contact area between the unevenness forming members and the gob is large and the gob is likely to be affected by thermal expansion when S1/S2 is set to a value exceeding 0.4. Meanwhile, the reason for this is that it may be difficult to suppress the falling of the lump of the stored material to the outside of the container since the uneven shapes formed on the inner peripheral surface of the glass container are excessively reduced in size when S1/S2 is set to an excessively small value.

Accordingly, when the total area of the opening portions of the molding surface member is denoted by S1 (mm²) and the area of the inner portion of the glass container having a finished shape is denoted by S2 (mm²), S1/S2 is more preferably set to a value within the range of 0.15 to 0.3 and is still more preferably set to a value within the range of 0.1 to 0.2.

Meanwhile, "the area of the inner portion of the glass container having a finished shape" means the sum of the area of the inner peripheral surface of the glass container having a finished shape and the area of the inner bottom surface of the glass container having a finished shape.

Figure 16A:
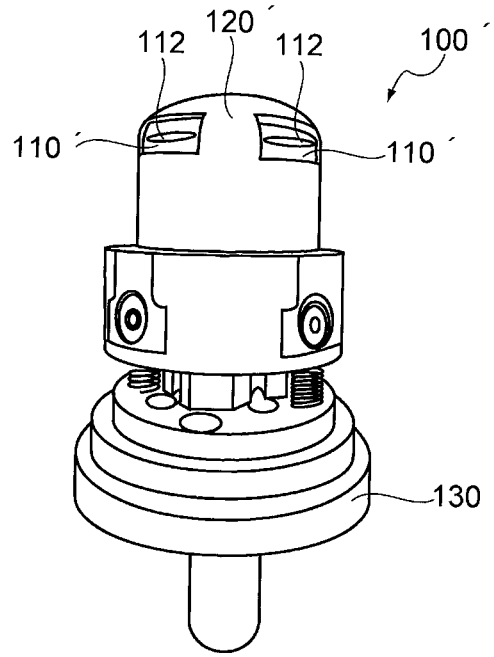
FIGS. 16(a) and 16(b) are diagrams illustrating another aspect of the plunger.
Figure 16B:
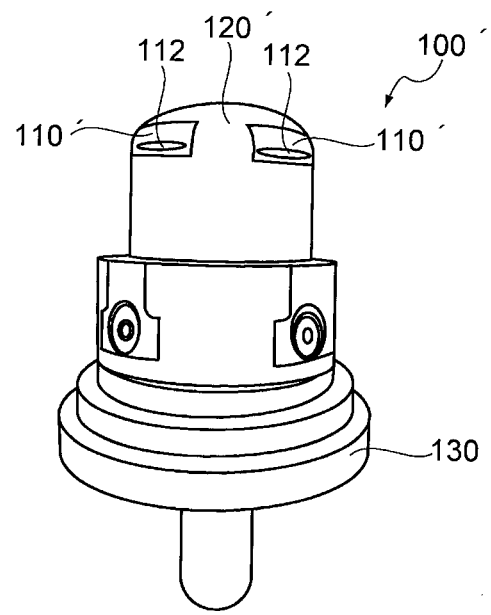

Further, examples of an aspect of the plunger in which S1/S2 has a value of 0.4 or less include an aspect illustrated in, for example, FIGS. 16(*a*) and 16(*b*).

That is, the area of each opening portion of a molding surface member 120 of a plunger 100' of an aspect illustrated in FIGS. 16(*a*) and 16(*b*) is smaller than that of the plunger 100 of the aspect illustrated in FIGS. 12(*a*) and 12(*b*).

More specifically, in the plunger 100 illustrated in FIGS. 12(*a*) and 12(*b*), the opening portions are formed so as to reach the lowest portion of a molding surface portion of the molding surface member 120 and not only lateral grooves 112, which are uneven portions of the unevenness forming members 110, and portions around the lateral grooves 112 but also the wide lower portions of the lateral grooves of a molding surface, which is used to mold the inner peripheral surface of the glass container, are exposed from the opening portions.

In contrast, in the plunger 100' illustrated in FIGS. 16(*a*) and 16(*b*), opening portions are formed at only an upper portion of a molding surface member 120' (for example, a position above the middle point of the height of the molding surface portion of the molding surface member 120') and only lateral grooves 112, which are uneven portions of the unevenness forming members 110', and portions of the molding surface around the lateral grooves 112 are exposed from the opening portions.

Meanwhile, FIGS. 16(*a*) and 16(*b*) are perspective views illustrating the shape of the entire plunger 100', FIG. 16(*a*) illustrates a state in which the unevenness forming members 110' are received in the plunger 100', and FIG. 16(*b*) illustrates a state in which the unevenness forming members 110' are pressed to the outside from the inside of the plunger 100'.

Figure 17A:
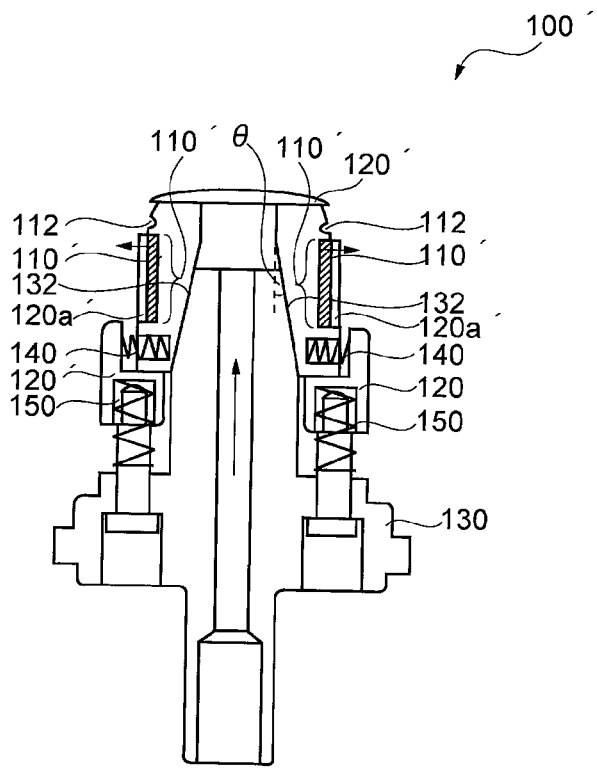
FIGS. 17(a) and 17(b) are diagrams illustrating the mechanism of another aspect of the plunger.
Figure 17B:
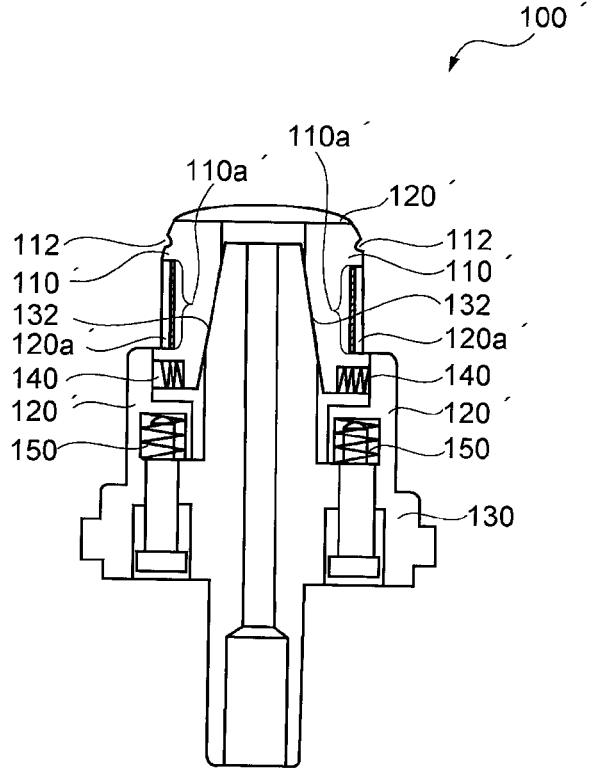

Further, cross-sectional views, which are obtained when the plunger 100' is cut in the vertical direction, are illustrated in FIGS. 17(*a*) and 17(*b*).

That is, in the plunger 100', a concave portion 110*a*' is formed on a portion of the side surface positioned below a portion, which is exposed from the opening portion, in the cross-sectional shape of the unevenness forming member 110'.

A portion, which is positioned below the portion exposed from the opening portion, of the concave portion 110*a*' is received in a side surface portion 120*a*' of the molding surface member 120' and the concave portion 110*a*' is provided so as to be slidable in a horizontal direction while being received on the inside of the side surface portion 120*a*' of the molding surface member 120'.

Accordingly, when the unevenness forming members 110' are received in the plunger 100' as illustrated in at least FIG. 17(*a*), a gap, which is equal to or larger than the stroke of the unevenness forming member 110', needs to be ensured between the innermost portion of the concave portion 110*a*' of each unevenness forming member 110' and the inner wall of the side surface portion 120*a*' of the molding surface member 120'.

Further, since this structure is employed, the number of the sliding surfaces between the unevenness forming members 110' and the molding surface member 120' of the plunger 100' becomes larger than that of the plunger 100.

More specifically, since the side surface portions 120*a*' of the molding surface member 120' are fitted to the concave portions 110*a*' of the unevenness forming members 110' in the plunger 100' as illustrated in FIGS. 17(*a*) and 17(*b*), two sliding surfaces are increased compared with the plunger 100.

As a result, since the plunger 100' allows the unevenness forming members 110' to more stably slide than the plunger 100, the plunger 100' can contribute to the more stable formation of uneven shapes.

Meanwhile, the shape and size of each member of the plunger are not particularly limited since varying according to the shape of a glass container to be manufactured. However, generally, the diameter of the plunger is preferably set to a value within the range of 10 to 50 mm and the length of a portion of the plunger to be inserted is preferably set to a value within the range of 10 to 50 mm.

(3) Blow Head

Figure 18:
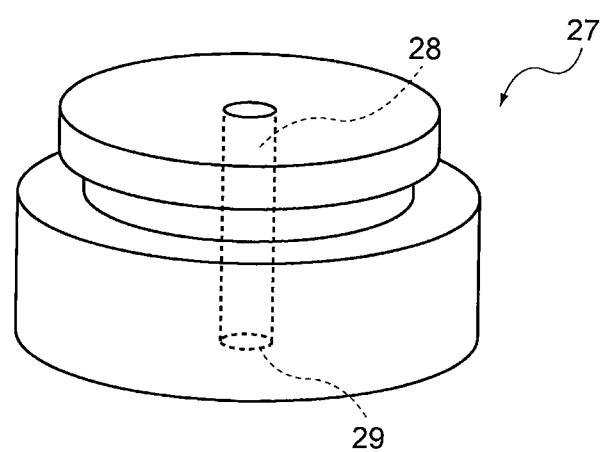
FIG. 18 is a diagram illustrating a blow head.

Further, a blow head 27 illustrated in FIG. 18 is a member that efficiently blows the first cooling air 41 into the glass container 32 having a finished shape that is received at a predetermined position in the cooling mold 20 to be described below as illustrated in FIG. 9(*b*).

As illustrated in FIG. 18(*b*), the blow head 27 includes a blowing hole 28 that blows the first cooling air 41, and an outlet (first outlet) 29 that blows the first cooling air 41 into the glass container 32 having a finished shape. As illustrated in FIG. 9(*b*), the blow head 27 is disposed so as to be separated from the mouth portion 32*a* of the glass container 32 having a finished shape and the support 21 that supports the mouth portion 32*a*.

Accordingly, the first cooling air 41, which is blown through the blowing hole 28, is supplied into the glass container 32 having a finished shape through the first outlet 29, and the blown first cooling air 41 can be efficiently discharged from a gap between the blow head 27 and the mouth portion 32*a* of the glass container 32 having a finished shape and the support 21.

Therefore, the glass container having a finished shape can be efficiently cooled from the inner surface thereof without the swelling of the glass container that is caused by blown air as in blow-and-blow molding or press-and-blow molding.

Further, since a discharge hole for the first cooling air 41 does not need to be formed in the blow head 27 when the blow head 27 is disposed as described above, machining performed inside the blow head can be simplified.

Meanwhile, like the above-mentioned mold and the like, the blow head 27 can also be made of an iron alloy, brass, a copper-nickel alloy, or the like.

FIG. 18 is a perspective view of the blow head 27.

Figure 19A:
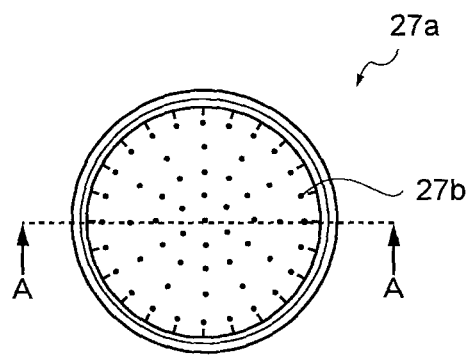
FIGS. 19(a) and 19(b) are diagrams illustrating a cooling member that is received in the blow head.
Figure 19B:
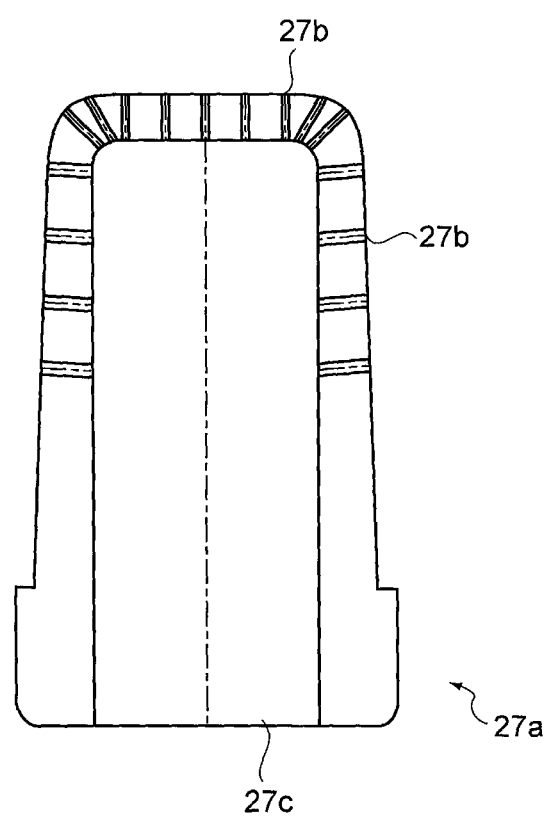

Furthermore, it is preferable that the blow head 27 includes a cooling member 27a received in the blow head as illustrated in FIGS. 19(a) and 19(b).

Here, the cooling member 27a is a cylindrical member that includes a predetermined flat portion at a tip portion thereof, and includes a plurality of blowout holes 27b that are formed at the tip portion of the cooling member and a side wall near the tip portion.

Accordingly, the first cooling air 41 is blown into the glass container 32 having a finished shape, which is received at a predetermined position in the cooling mold 20, from the plurality of blowout holes 27b that are formed at the cooling member 27a.

Further, while the blown first cooling air 41 is efficiently discharged from the gap between the blow head 27 and the mouth portion 32a of the glass container 32 having a finished shape and the support 21 as described above, the glass container 32 having a finished shape can be effectively cooled from the inner surface thereof.

Meanwhile, FIG. 19(a) is a plan view of the cooling member 27a, and FIG. 19(b) is a cross-sectional view that is obtained when the cooling member 27a illustrated in FIG. 19(a) is cut along a dotted line A-A in the vertical direction and the cross-section of the cooling member is viewed in a direction of an arrow.

(4) Cooling Mold

Figure 20:
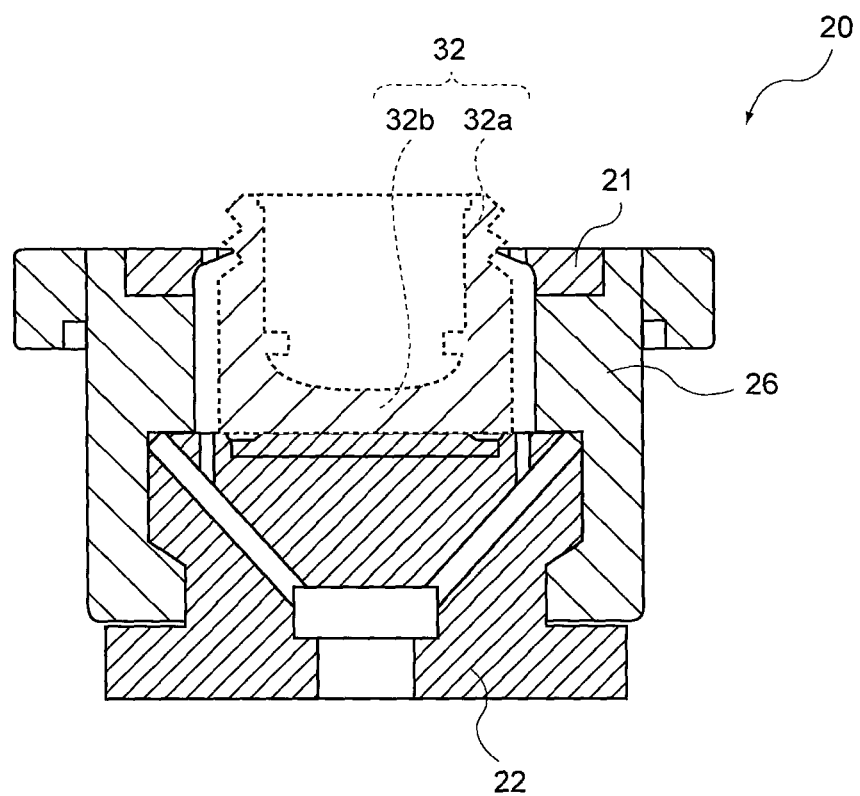
FIG. 20 is a diagram illustrating a cooling mold.

The cooling mold 20 illustrated in FIG. 20 is a mold that is used to cool the glass container 32 having a finished shape while holding the glass container 32 therein as illustrated in FIG. 9(b).

As illustrated in FIG. 20, the cooling mold 20 includes the support 21 that supports the mouth portion 32a of the glass container 32 having a finished shape and the placement portion 22 on which the bottom portion 32b of the glass container 32 having a finished shape is placed.

The cooling mold 20 includes a finishing mold 26 that is disposed at a position corresponding to the side surface of the glass container 32 having a finished shape, the support 21 that is provided at a position corresponding to the mouth portion of the finishing mold 26, and a bottom mold 22 as the placement portion.

The cooling mold 20 is to only cool the glass container 32 having a finished shape unlike the pressing mold 11, and does not come into direct contact with the side portion of the glass container 32 having a finished shape. Accordingly, generally, the cooling mold is made of cast metal, an iron alloy, brass, or the like, and the shape of the cooling mold can also be appropriately changed according to the outer shape of a glass container 32 to be manufactured.

However, as in the above-mentioned mold 11, it is also preferable that a lining made of a nickel alloy or the like is provided or a mold release agent is applied to the inner surface of the cooling mold 20.

Meanwhile, FIG. 20 is a cross-sectional view that is obtained when the cooling mold 20 is cut in the vertical direction.

Further, the support 21 is a member that supports the mouth portion 32a of the glass container 32 having a finished shape and holds the glass container 32 in the cooling mold 20.

Furthermore, the cooling mold 20 illustrated in FIG. 20 is adapted so that the finishing mold 26 is provided with the support 21.

Figure 21A:
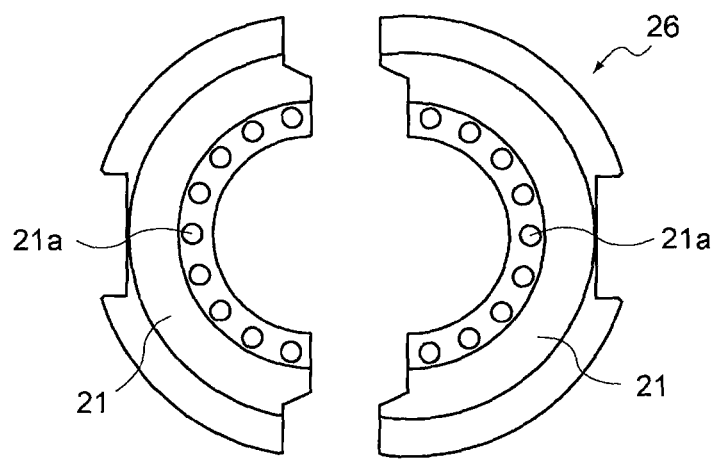
FIGS. 21(a) to 21(c) are diagrams illustrating a support and a finishing mold of the cooling mold.
Figure 21B:
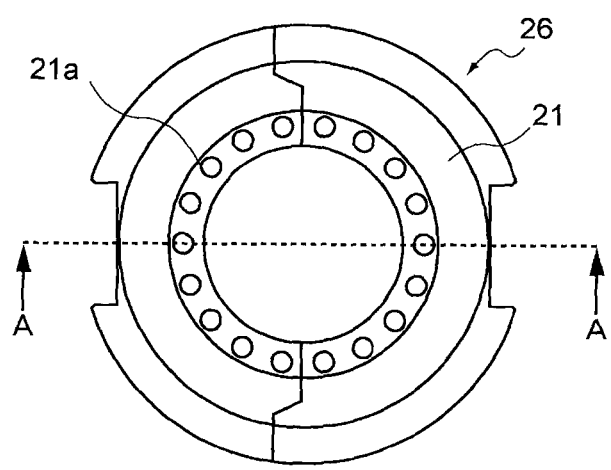

The finishing mold 26 provided with the support 21 is formed of, for example, two divided components as illustrated in FIGS. 21(a) and 21(b), and is adapted so that the glass container 32 having a finished shape is interposed between the two divided components.

Further, the mouth portion 32a of the glass container 32 having a finished shape is supported by the support 21, and the gap 35 is formed between the outer peripheral surface of the glass container 32 having a finished shape and the finishing mold 26 so that the outer peripheral surface of the glass container 32 having a finished shape and the finishing mold 26 do not come into contact with each other.

Accordingly, since the cooling mold 20 comes into contact with only the mouth portion 32a of the glass container 32 having a finished shape, it is possible to effectively prevent variation from being generated in cooling temperature.

Furthermore, since the support 21 is also disposed not to come into contact with the blow head 27 as illustrated in FIG. 9(b), the first cooling air 41 can be efficiently discharged.

Figure 21C:
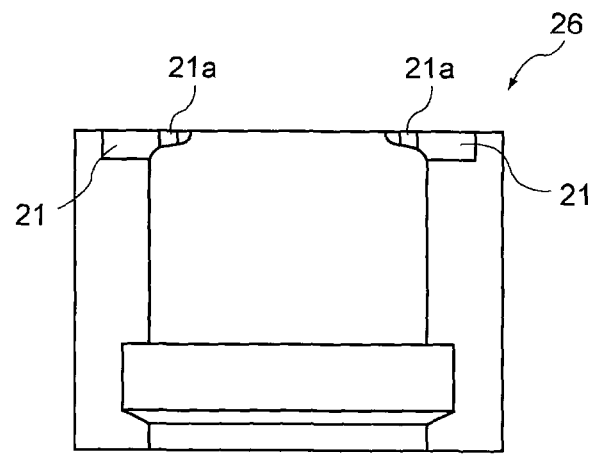

Meanwhile, FIGS. 21(a) and 21(b) are plan views of the finishing mold 26, and FIG. 21(c) is a cross-sectional view that is obtained when the finishing mold 26 illustrated in FIG. 21(b) is cut along a dotted line A-A in the vertical direction and the cross-section of the finishing mold is viewed in a direction of an arrow.

Further, it is preferable that the support 21 is provided with discharge holes 21a for the second cooling air 43 as illustrated in FIGS. 21(a) to 21(c).

The reason for this is that the second cooling air 43 blown from the lower side may be made to flow through the gap 35, which is formed between the outer peripheral surface of the glass container 32 having a finished shape and the finishing mold 26, from the bottom portion to the mouth portion and may uniformly cool the entire glass container 32 having a finished shape.

Accordingly, since the second cooling air 43 is not directly blown to the glass container 32 having a finished shape and an excellent cooling effect can be obtained, the quality of a manufactured glass container 50 can be significantly improved.

Furthermore, since machining for the discharge holes for the second cooling air 43 does not need to be performed inside the finishing mold 26, the structure of the cooling mold 20 can be simplified and the manufacturing cost of the cooling mold 20 can be reduced.

Moreover, the bottom mold 22 as the placement portion is a member on which the bottom portion of the glass container 32 having a finished shape is placed, and the finishing mold 26 is a member that is disposed at a position corresponding to the side surface of the glass container 32 having a finished shape.

Figure 22A:
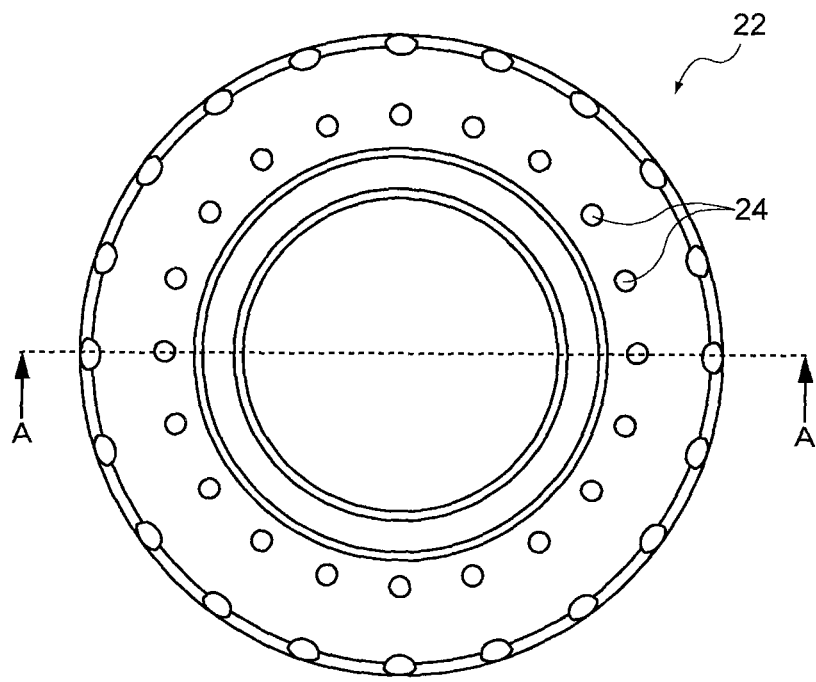
FIGS. 22(a) and 22(b) are diagrams illustrating a bottom mold as a placement portion of the cooling mold.
Figure 22B:
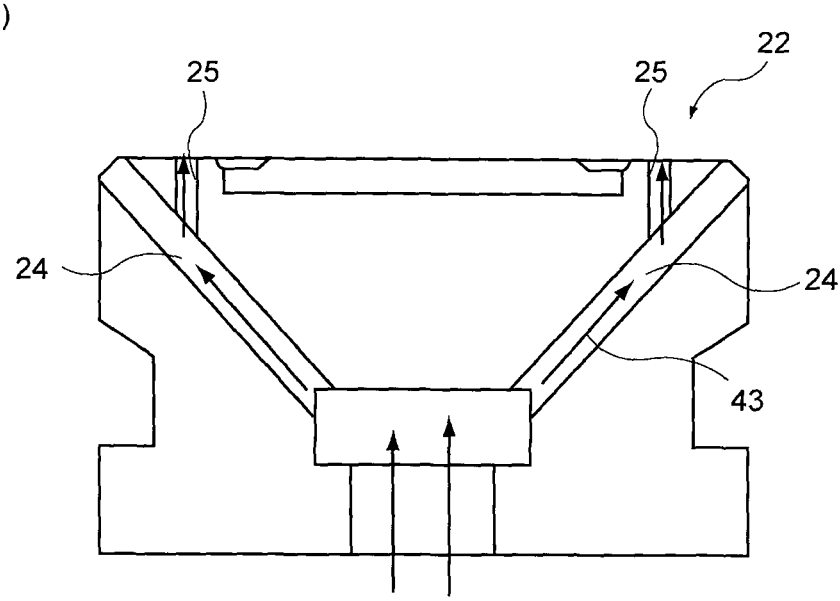
Figure 23:
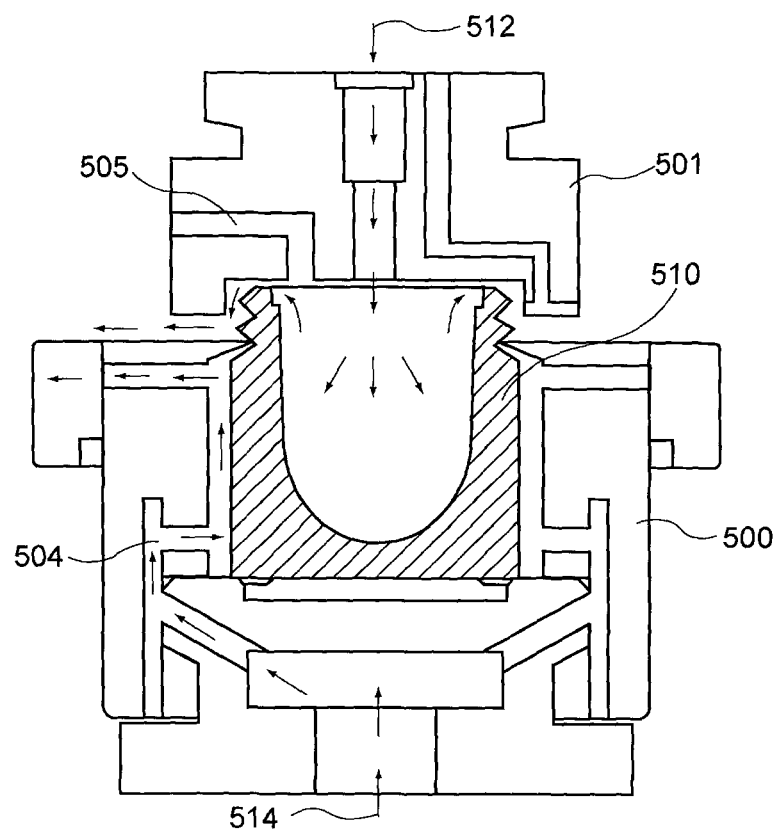
FIG. 23 is a diagram illustrating a one-press manufacturing method in the related art.
Figure 24:
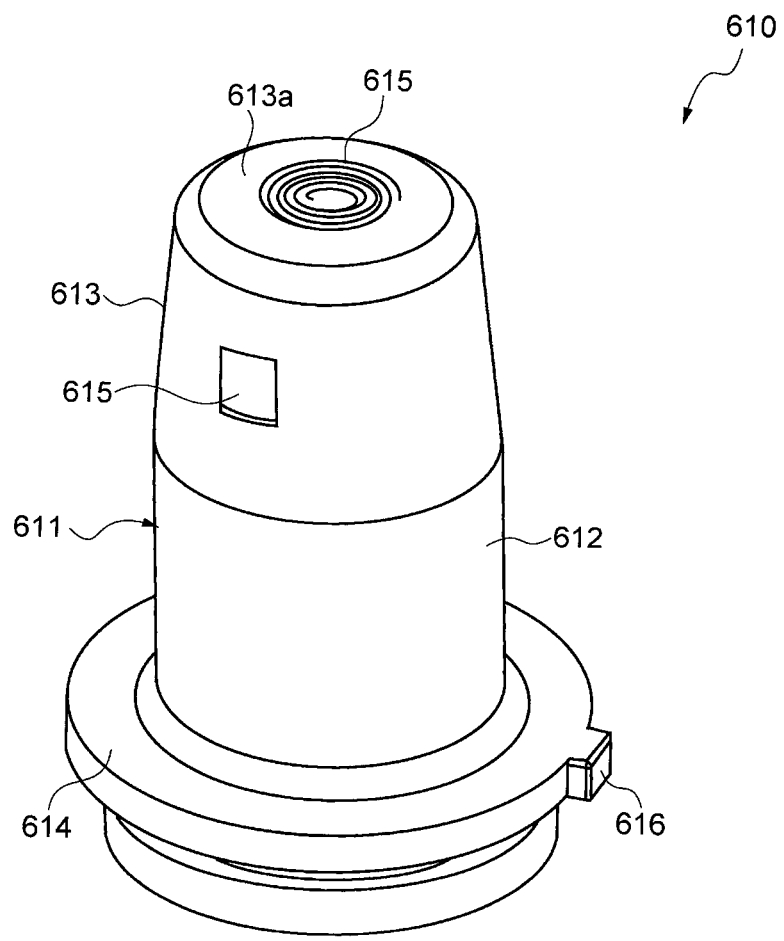
FIG. 24 is a diagram illustrating a plunger in the related art.
Figure 25:
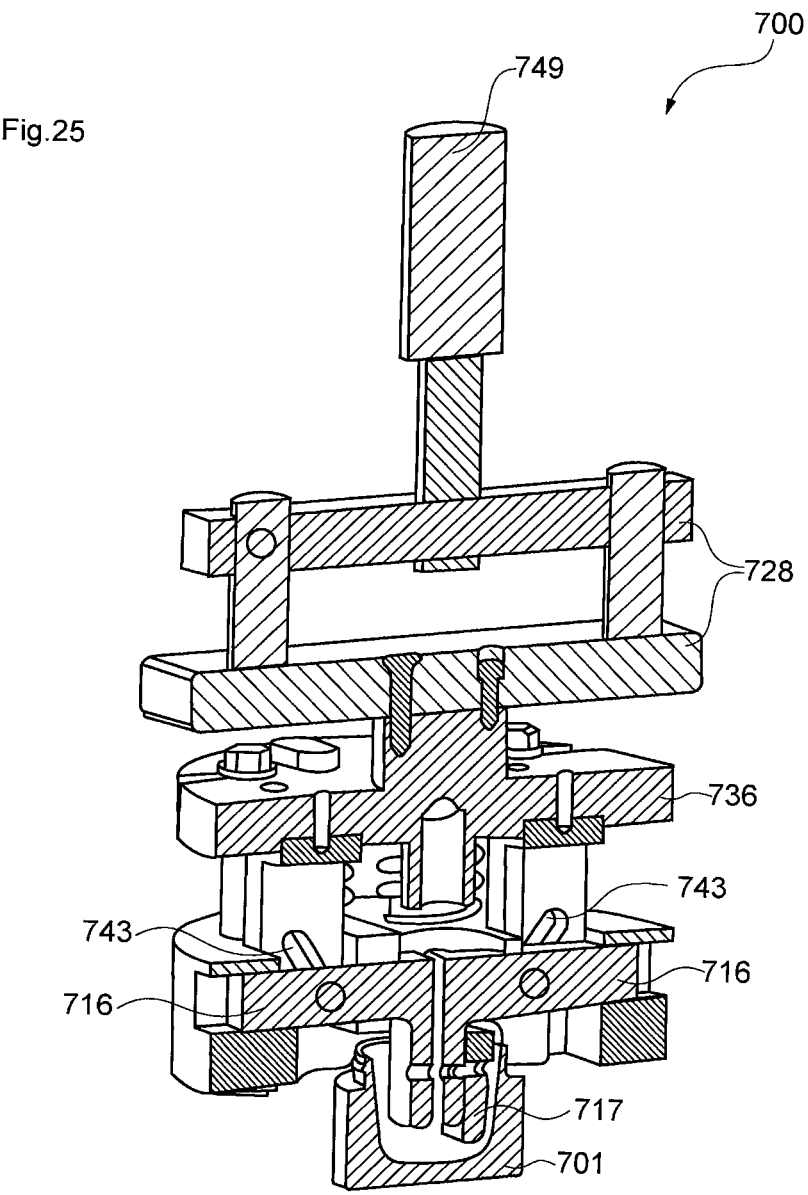
FIG. 25 is another diagram illustrating the plunger in the related art.
Figure 26:
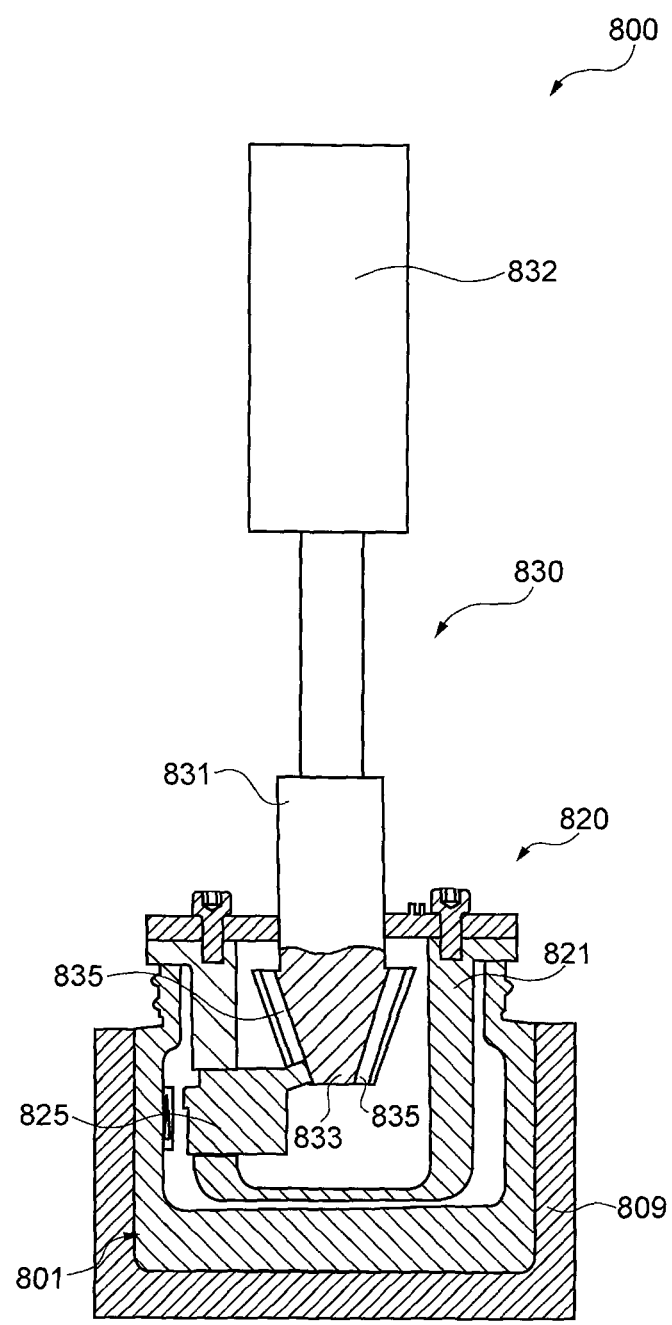
FIG. 26 is still another diagram illustrating the plunger in the related art.

As illustrated in FIGS. 22(a) and 22(b), the bottom mold 22 includes blowing holes 24 that blow the second cooling air 43, and second outlets 25 that blow the second cooling air 43, which is made to flow through the gap 35 formed between the outer peripheral surface of the glass container 32 having a finished shape and the finishing mold, from the lower side of the glass container 32 having a finished shape without directly blowing the second cooling air 43 to the glass container.

Meanwhile, FIG. 22(a) is a plan view of the bottom mold 22, and FIG. 22(b) is a cross-sectional view that is obtained when the bottom mold 22 illustrated in FIG. 22(a) is cut along a dotted line A-A in the vertical direction and the cross-section of the bottom mold 22 is viewed in a direction of an arrow.

When the cooling mold 20 provided with the finishing mold 26 including the support 21 and the placement portion (bottom mold) 22 is used, the second cooling air 43 can be blown in a predetermined direction (the vertical direction) from the second outlets 25 provided below the glass container 32 having a finished shape. Accordingly, the second cooling air 43 is not directly blown to the glass container 32 having a finished shape.

Therefore, it is possible to effectively prevent the deformation of the glass container 32 having a finished shape that is caused by the pressure of the second cooling air 43 or the like.

Further, since the second cooling air 43 blown from the second outlets 25 is made to flow through the gap 35 that is formed between the glass container 32 having a finished shape and the finishing mold 26, the glass container 32 having a finished shape can be efficiently and uniformly cooled from the inner surface and the outer peripheral surface thereof by the second cooling air 43 together with the first cooling air 41.

Furthermore, since unnecessary unevenness or the like is not formed on the surface of a glass container 50 to be obtained regardless of the state or temperature of the inner surface of the finishing mold 26, the quality of the glass container 50 to be obtained can be improved.

Meanwhile, since the bottom mold 22 provided below the glass container 32 having a finished shape is provided with the second outlets 25 for the second cooling air 43, blowing holes for the second cooling air 43 do not need to be formed in the finishing mold 26 corresponding to the side surface of the glass container 32 having a finished shape and a positional deviation between the blowing holes of the bottom mold 22 and the finishing mold 26, and the like also do not need to be controlled.

Accordingly, the structure of the cooling mold 20 can be significantly simplified and the manufacturing cost of the cooling mold 20 can also be reduced.

Further, the temperature of the cooling mold 20 can be determined in consideration of the coolability, appearance characteristics, economic efficiency, or the like of the glass container having a finished shape. Generally, it is preferable that the surface temperature of the glass container 32 having a finished shape is set to a value within the range of 500 to 800° C.

The reason for this is that the glass container having a finished shape including the thickest portion having a thickness of a predetermined value or more may be molded by one-time press and the deterioration of appearance of the glass container occurring during the cooling of the glass container or the number of uneven portions formed on the surface of the glass container may be reduced when the surface temperature of the glass container having a finished shape received in the cooling mold is set to a value within a predetermined range as described above.

More specifically, the reason for this is as follows: since the glass container having a finished shape is excessively cooled when the temperature of the cooling mold is lower than 500° C., the appearance of the glass container may deteriorate or the number of uneven portions formed on the surface of the glass container may be increased and there may be an economic disadvantage due to the excessive use of the first cooling air and the second cooling air.

Meanwhile, the reason for this is that the appearance of the glass container may deteriorate or the number of uneven portions formed on the surface of the glass container may be increased in the post step since the cooling of the glass container having a finished shape is insufficient conversely when the temperature of the cooling mold exceeds 800° C.

Accordingly, the temperature of the cooling mold is more preferably set to a value within the range of 550 to 780° C. and is still more preferably set to a value within the range of 600 to 750° C.

INDUSTRIAL APPLICABILITY

According to the one-press manufacturing method for a glass container of the invention, it is possible to form uneven shapes on the inner peripheral surface of the glass container in spite of a one-press manufacturing method by using the plunger including predetermined unevenness forming members.

Accordingly, in spite of a one-press manufacturing method, it is possible to manufacture a glass container that effectively suppresses the falling of a lump of the stored material, such as foundation or eye shadow, to the outside of the container even though the glass container is inverted. In addition, it is also possible to form uneven shapes, which have excellent design, on the inner peripheral surface of the glass container.

EXPLANATIONS OF LETTERS OR NUMERALS

10: Individual section machine
11: Pressing mold
12: Funnel
15: Rotating device
15a: Arm
20: Cooling mold
21: Support
21a: Discharge hole
22: Placement portion
24: Blowing hole
25: Second outlet
26: Finishing mold
27: Blow head
27a: Cooling member
28: Blowing hole
29: First outlet
31: Gob
32: Glass container having finished shape
32a: Mouth portion
32b: Bottom portion
35: Gap
41: First cooling air
43: Second cooling air
50: Glass container
50a: Mouth portion
50b: Main body
60: Inner peripheral surface
62: Uneven shape
70: Lump of stored material
100: Plunger
110: Unevenness forming member
112: Lateral groove
120: Molding surface member 122: Opening portion
130: Pressing member
132: Inclined surface
134: Cooling air groove
140: First spring member
150: Second spring member

The invention claimed is:

1. A one-press manufacturing method for a glass container comprising;
   (A) a step of putting a gob in a pressing mold and then inserting a plunger, which includes an unevenness forming member provided so as to be capable of being received in the plunger, into the gob while the unevenness forming member is received in the plunger,
   (B) a step of forming a glass container having a finished shape, which includes an uneven shape on an inner peripheral surface thereof, by pressing the unevenness forming member against the surface of the gob, which comes into contact with the unevenness forming member, to the outside from the inside of the plunger,
   (C) a step of receiving the unevenness forming member in the plunger,
   (D) a step of extracting the plunger, in which the unevenness forming member is received, from the glass container having a finished shape that includes the uneven shape on the inner peripheral surface thereof, and
   (E) a step of transporting the glass container having a finished shape, which includes the uneven shape on the inner peripheral surface thereof, to a cooling mold and cooling the glass container having a finished shape.

2. The one-press manufacturing method for a glass container according to claim 1,
   wherein the plunger includes the unevenness forming member, a molding surface member that includes an opening portion receiving the unevenness forming member, and a pressing member that is movably fitted to the molding surface member, and
   the pressing member is pressed into the molding surface member, so that the unevenness forming member is pressed to the outside from the inside of the plunger through the opening portion of the molding surface member.

3. The one-press manufacturing method for a glass container according to claim 2,
   wherein the pressing member includes an inclined surface which is inclined toward a tip of the plunger, and when the pressing member is pressed into the molding surface member, the unevenness forming member is pressed to the outside from the inside of the plunger through the opening portion of the molding surface member by the inclined surface.

4. The one-press manufacturing method for a glass container according to claim 3,
   wherein the plunger includes a plurality of unevenness forming members, and
   the pressing member includes inclined surfaces of which the number is equal to the number of the unevenness forming members.

5. The one-press manufacturing method for a glass container according to claim 3,
   wherein the pressing member includes a cooling-air introduction passage that is provided in the pressing member and a cooling air hole that allows cooling air, which is present in the cooling-air introduction passage, to flow to the outside of the pressing member, and
   the inclined surface of the pressing member includes a cooling air groove that allows the cooling air, which flows out of the cooling air hole, to flow between the pressing member and the unevenness forming member.

6. The one-press manufacturing method for a glass container according to claim 2,
   wherein the unevenness forming member is biased by a sprig member so as to be received in the opening portion of the molding surface member except when the pressing member is pressed into the molding surface member.

7. The one-press manufacturing method for a glass container according to claim 6,
   wherein except when the pressing member is pressed into the molding surface member, the pressing member is biased by a second spring member, which is a spring member separate from a first spring member when the spring member is referred to as the first spring member, so that the unevenness forming member is received in the opening portion of the molding surface member.

8. The one-press manufacturing method for a glass container according to claim 2,
   wherein when a total area of the opening portions of the molding surface member is denoted by S1 ($mm^2$) and the area of an inner portion of the glass container having a finished shape is denoted by S2 ($mm^2$), S1/S2 is set to a value of 0.4 or less.

9. The one-press manufacturing method for a glass container according to claim 1,
   wherein the unevenness forming member includes a lateral groove on a contact surface thereof coming into contact with the surface of the gob.

* * * * *